United States Patent
Zimran et al.

(10) Patent No.: US 7,688,753 B1
(45) Date of Patent: Mar. 30, 2010

(54) SELECTION OF A DATA PATH BASED ON ONE OR MORE PERFORMANCE CHARACTERISTICS OF A COMPUTER SYSTEM

(75) Inventors: Eyal Zimran, London (GB); Sorin Faibish, Newton, MA (US); Jason R. Glasgow, Newton, MA (US)

(73) Assignee: EMC Corporation, Hopkinton, MA (US)

( * ) Notice: Subject to any disclaimer, the term of this patent is extended or adjusted under 35 U.S.C. 154(b) by 262 days.

(21) Appl. No.: 11/966,662

(22) Filed: Dec. 28, 2007

(51) Int. Cl.
*H04L 12/26* (2006.01)
(52) U.S. Cl. .................. 370/252; 370/465; 702/182
(58) Field of Classification Search .................. None
See application file for complete search history.

(56) References Cited

U.S. PATENT DOCUMENTS

| | | | |
|---|---|---|---|
| 5,701,516 A * | 12/1997 | Cheng et al. ............... 710/22 |
| 6,389,432 B1 * | 5/2002 | Pothapragada et al. ...... 707/205 |
| 7,058,545 B2 * | 6/2006 | Chang et al. ................ 702/186 |
| 7,213,021 B2 * | 5/2007 | Taguchi et al. ............... 707/10 |
| 2005/0108450 A1 * | 5/2005 | Sahara et al. ................. 710/52 |
| 2007/0055737 A1 * | 3/2007 | Yamashita et al. .......... 709/213 |
| 2008/0222661 A1 * | 9/2008 | Belyakov et al. ............ 719/321 |

OTHER PUBLICATIONS

U.S. Appl. No. 11/966,615, filed Dec. 28, 2007, Zimran et al.
U.S. Appl. No. 11/966,645, filed Dec. 28, 2007, Zimran et al.

* cited by examiner

*Primary Examiner*—Min Jung
(74) *Attorney, Agent, or Firm*—Muirhead and Saturnelli, LLC

(57) ABSTRACT

Embodiments of the present invention are directed to techniques for selecting a data path over which to exchange information between a client device and a storage system by making a selection between a file system server (NAS) data path type (a first data path type) and a direct (SAN) data path type (a second data path type) based on one or more adjustable path selection factors and/or information regarding components of the computer system. For example, a data path may be selected based on one or more performance characteristics of a computer system in which a path selection module is acting and/or any other suitable path selection factor.

29 Claims, 10 Drawing Sheets

SELECTION OF A DATA PATH BASED ON ONE OR MORE PERFORMANCE CHARACTERISTICS OF A COMPUTER SYSTEM

BACKGROUND OF INVENTION

1. Field of Invention

Embodiments of the present invention relate to techniques for selecting a data path over which to exchange information between a client device and a storage system. More specifically, embodiments of the invention relate to processes and systems for making a selection between a first data path and a second data path extending between the client device and the storage system, in which the first data path passes through a file system server so that the client device exchanges the information with the storage system using a file system interface for the storage system, and in which the second data path does not pass through the file system server.

2. Discussion of Related Art

In some conventional computer configurations, a data storage system is employed to provide a centralized storage point for data which may be written to or read from by one or more computers including, for example, clients and servers (referred to collectively as clients) coupled to the storage system. These conventional data storage systems may be accessed in a number of ways. In one implementation, a file system interface is provided for the data storage system, and as the one or more clients exchanges data with the storage system, the file system determines where the data should be written to or read from. This is often referred to as a network-attached storage (NAS) system wherein the file system interface enables data on the storage system to be shared by the clients.

A file system interface may be provided via a server that is separate from the data storage system. This implementation removes the processing associated with the file system functionality from the data storage system. In a computer configuration according to this implementation, a computer seeking to exchange data with the data storage system will instead exchange data with the file system server, and the file system server will use its knowledge of the structure and format of the data storage system to write the data to the data storage system or read the data from the data storage system.

In some conventional networks operating according to the latter technique discussed above, it was appreciated that transferring the data from the storage system to the file system server and from the file system server to the requesting client can result in an inefficient extra step in the exchange for some transactions. Some NAS computer configurations therefore used a third technique. In this third implementation, a computer seeking to exchange small amounts of data (e.g., amounts of data below a specified threshold amount) would exchange the data through the file system server over a first data path in the conventional manner, but for large amounts of data (e.g., amounts of data above the specified threshold amount) the client would interact directly with the data storage system over a second data path that does not include the file system server. For large amounts of data, then, a client would request from the file system server information (e.g., metadata) about where the requested data is stored on the storage system, and then would use this information to interact with the data storage system directly to retrieve the data. An illustrative system which operates according to this technique is the Celerra Multi-Path File System (MPFS) (also known as the HighRoad system) available from EMC Corporation of Hopkinton, Mass.

A conventional computer system implementing the third technique is shown in FIG. 1. A client computer 102 is shown in a computer system 100 along with a file system server 104 and a data storage system 106. The client computer 102 is connected to the file system server 104 and to the data storage system 106, and the file system server 104 is connected to the data storage system 106. Computer software is installed on the client computer 102 having instructions on how to exchange data between the client computer 102 and the data storage system 106, and the computer software is configured by an administrator with a threshold size (e.g., 64 kilobytes). This threshold is used by the computer 102 (i.e., by the computer software executing on the computer 102) when determining how to exchange data between the client computer 102 and the data storage system 106. For example, if a computer 102 seeks to write 32 KB of data to a file stored on the data storage system 106, then the computer 102 will send the 32 KB of data to the file system server 104 and the file system server 104 will write the 32 KB of data to the appropriate location in the data storage system 106 (i.e., the location of the file in the data storage system 106). If, however, the computer 102 seeks to write 128 KB of data to a file stored on the data storage system 106, then the computer 102 will receive from the file system server 104 metadata specifying the location in the data storage system 106 of the data blocks that make up the file, and then will write the 128 KB of data directly to the data storage system 106 in the location(s) specified by the file system server 104.

It should be appreciated that the diagram of FIG. 1 is merely a simple, conceptual representation of the types of systems which may be implemented in accordance with the third technique. In the diagram, while one of each element (e.g., client computer, file system server, data storage system) is shown, in some implementations there may be a plurality of client computers, a plurality of file system servers, and/or a plurality of storage systems. Additionally, while the data paths between the elements of the network are shown in FIG. 1 as direct connections, the data paths may be implemented in any suitable manner, such as in a computer network comprising a plurality of network links and networking devices such as routers and switches. Each of the three data paths shown in FIG. 1 may be implemented as a separate computer network implemented in any suitable manner (i.e., with any suitable network links and any suitable protocol) or otherwise. Additionally, each of the data paths shown in FIG. 1 may be implemented as a plurality of parallel links (e.g., the data path between the client computer 102 and the data storage system 106 may be a number of links all connecting the client computer to the data storage system 106 in parallel). Selecting an individual link of a data path, once a data path type is selected, may be done in any suitable manner. An example of a system that may be used to select a specific link once a path type is selected is the PowerPath system available from EMC Corporation.

When parallel links are employed (e.g., between the client computer and the file system server and/or the storage system), the techniques described above can be employed to select a data path type for handling an I/O operation (i.e., a data path that passes through the file system server or one that does not), and any suitable technique can be employed for selecting one or more specific links of the selected type.

SUMMARY OF INVENTION

In one embodiment, there is provided a method for use in a computer system. The computer system comprises at least one client device, at least one storage system that provides at least one volume of storage to store information, and at least one file system server that provides a file system interface for at least some of the information stored on the at least one volume of storage. The computer system further comprises at least first and second data paths extending between the at least one client device and the at least one storage system, the first data path passing through the at least one file system server so that the at least one client device exchanges information with the at least one storage system via the first path using the file system interface, and the second data path not passing through the at least one file system server so that the client device exchanges information with the at least one storage system via the second path using a storage system interface presented by the at least one storage system. The method comprises acts of, for an input/output (I/O) operation, generated by the at least one client device, that seeks to exchange a first set of information between the at least one client device and the at least one storage system, examining information specifying at least one performance characteristic of at least one component of the computer system and selecting between the first and second data paths for exchanging the first set of information based at least in part on the at least one performance characteristic of the at least one component of the computer system.

In another embodiment, there is provided at least one computer-readable medium encoded with computer-executable instructions that, when executed perform a method for use in a computer system. The computer system comprises at least one client device, at least one storage system that provides at least one volume of storage to store information and at least one file system server that provides a file system interface for at least some of the information stored on the at least one volume of storage. The computer system further comprises at least first and second data paths extending between the at least one client device and the at least one storage system, the first data path passing through the at least one file system server so that the at least one client device exchanges information with the at least one storage system via the first path using the file system interface, and the second data path not passing through the at least one file system server so that the client device exchanges information with the at least one storage system via the second path using a storage system interface presented by the at least one storage system. The method comprises acts of, for an input/output (I/O) operation, generated by the at least one client device, that seeks to exchange a first set of information between the at least one client device and the at least one storage system, examining information specifying at least one historical performance characteristic of at least one component of the computer system and selecting between the first and second data paths for exchanging the first set of information based at least in part on the at least one historical performance characteristic of the at least one component of the computer system.

In a further embodiment, there is provided an apparatus for use in a computer system. The computer system comprises at least one client device, at least one storage system that provides at least one volume of storage to store information, and at least one file system server that provides a file system interface for at least some of the information stored on the at least one volume of storage. The computer system further comprises at least first and second data paths extending between the at least one client device and the at least one storage system, the first data path passing through the at least one file system server so that the at least one client device exchanges information with the at least one storage system via the first path using the file system interface, and the second data path not passing through the at least one file system server so that the client device exchanges information with the at least one storage system via the second path using a storage system interface presented by the at least one storage system. The apparatus comprises at least one processor programmed to, for an input/output (I/O) operation, generated by the at least one client device, that seeks to exchange a first set of information between the at least one client device and the at least one storage system, examine information specifying at least one historical performance characteristic of at least one component of the computer system and select between the first and second data paths for exchanging the first set of information based at least in part on the at least one historical performance characteristic of the at least one component of the computer system.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

Figure 1:
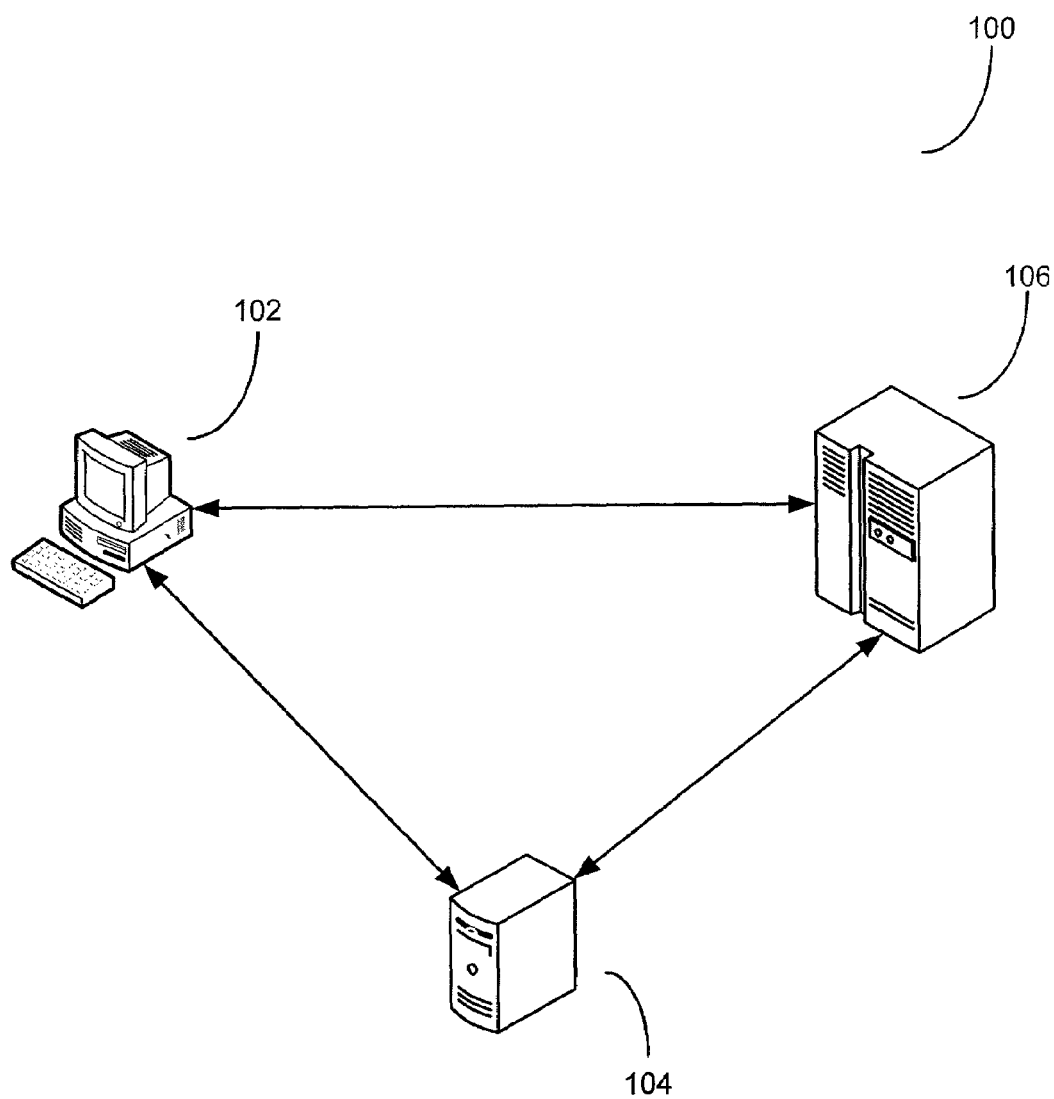
FIG. 1 is a conventional computer system having a client computer, a data storage system, and a file system server with which the client computer may interact.

As discussed above, data path type selection in conventional systems with two data paths extending between a client and a data storage system having a file system interface is done based on whether an amount of data to be exchanged exceeds a threshold. The thresholds which are used in conventional systems are fixed values set by configuration files of computer software on the system (e.g., on the client device and/or on the file system server). In conventional systems, an administrator (e.g., of a client device and/or of a computer network to which the client device is connected) specifies the threshold upon installation of the computer software, and the threshold is applied to all input/output (I/O) operations between the client device and the file system server/data storage system. The threshold cannot be changed while the computer software on the client device is executing for either a specific I/O operation or even all I/O operations, but rather the computer on which the configuration software resides must be rebooted before any change in the threshold will be recognized by the computer system.

The reason for conventionally selecting the direct data path type (i.e., the one that doesn't pass through the file system server) between the client and the storage system for only large files was the assumption that the extra hop for the data in passing through the file system server outweighed any efficiencies in having the file system server handle access requests to the data storage system for large files.

Applicants have appreciated, however, that there are situations in which it may not be optimal to access (e.g., read or write) a large file through the direct path, or where it may not be optimal to access a small file through the file system server path.

For example, in some computer systems, multiple clients may be reading information from and writing information to a shared file system. In these systems, the client devices may be reading and/or writing the same or similar information (e.g., the client devices may be executing the same or similar tasks) around the same time. The file server typically has a cache of information (including files) which is stored on the storage system, such that it may not need to retrieve information from the storage system each time it receives an access request (e.g., if it receives a read request for information in the cache, it may provide the information from the cache rather than retrieving it from the storage system). Thus, it may be more efficient (even for large files) to service access requests from data in the file system server cache rather than from the storage system. Additionally, Applicants have appreciated that by removing some operations from the storage system and serving them from another component of the system (e.g., the file system server), resources of the storage system may be used to perform other operations more quickly and efficiently, improving the overall performance of the system. Thus, in some systems, making a selection between data path types based only on the amount of information to be exchanged may not be optimal in all cases, but instead it may be more efficient to allow a selection to be made based at least in part on other information (e.g., information about whether the data is likely to be in a cache of the file system server).

Accordingly, in some embodiments of the invention, a data path selection between a first data path type through a file system server (e.g., network-attached storage (NAS) system interface such as a Network File System (NFS) interface or a CIFS interface) and a second data path type directly to a storage system (e.g., via a Storage Area Network (SAN) interface) is made, at least in part, on a determination of whether the information to be exchanged is likely to be in a cache of the file system server, with the first data path type being selected if the data is likely in the file system server cache and the second data path being selected if it is not likely.

Further, while until recently read and write operations traditionally took substantially the same amount of time to complete, Applicants have appreciated that storage systems are increasingly capable of performing read operations more efficiently than write operations (e.g., in approximately one-third of the time required to complete a write operation). Thus, Applicants have appreciated that, in some systems, it is not optimal to base path type selection only on an amount of data to be exchanged, because this selection fails to leverage efficiencies that may be gained by routing I/O operations according to the type of operation (i.e., read/write operations). For example, if a single data path is carrying intermingled read and write operations, then the read operations may be slowed from optimal performance by the slower write operations, and the process executing the I/O operations may be slowed as a result. Instead, because three read operations can be completed in the same time as one write operation, it may be advantageous to divide operations between different paths based, at least in part, on greater type (e.g., divide read operations from write operations), such that, for example, read operations can be processed quickly without being slowed by longer write operations.

Accordingly, in some embodiments of the invention, a data path selection between a first data path type passing through a file system server (referred to herein for convenience as a NAS path) and a second data path type that does not pass through the file server (referred to herein for convenience as a SAN path) is made, at least in part, by examining a type of an operation being executed and selecting the NAS path for read operations and the SAN path for write operations.

Applicants have further appreciated that fixed parameters implemented by conventional systems may not be optimal for governing path type selection for I/O operations in all systems. In one exemplary scenario, in a computer system comprising a plurality of client devices, a file system server, and a storage system, if all the client devices are requesting to read a large number of small files (i.e., files below a threshold) from the file system server, then response times from the file system server may drop as the file system server works to serve the large number of requests. If a client device in the example is configured to perform path type selection based only on the size of the requested file, then the client device may not be able to leverage the unused paths to the storage system to improve overall system performance. Thus, Applicants have appreciated that it may be advantageous to permit the system to adjust the path selection factors (e.g., parameters, thresholds, and/or weighting factors) governing data path type selection based on, for example, performance characteristics. In contrast to fixed path selection factors, in an adjustable system, the path selection factors for a data path type selection can be adjusted (e.g., a threshold for an amount of data may be lowered) when a client device detects from a lowered response time that a file system server is overloaded, such that more requests for files may be sent directly to the storage system (which may be able to service I/O operations faster because it may not be as heavily burdened as the file system server) and not to the file system server. Adjusting the path selection factors of a path type selection algorithm in this manner allows a system to adjust to changing characteristics to optimize performance.

Accordingly, in some embodiments of the invention, a data path type selection between a NAS path and a SAN path is made based, at least in part, on performance characteristics of one or more components of the computer system.

Additionally or alternatively, in some embodiments of the invention, path selection factors of a data path type selection process are determined dynamically in response to any suitable conditions, including, for example, performance characteristics for the computer system, the type of I/O operation being executed, or in response to any other suitable condition.

In view of the foregoing, some embodiments of the present invention are directed to techniques for making a selection between a file system server (NAS) data path type (a first data path type) and a direct (SAN) data path type (a second data path type) based on one or more adjustable path selection factors and/or information regarding components of the computer system. It should be appreciated that while several techniques for performing a data path type selection are described herein, embodiments of the invention are not limited to implementing any particular technique, nor are embodiments of the invention limited to implementing each of the described techniques separately, as some embodiments of the invention may combine any two or more of the techniques described herein in any suitable manner.

In some embodiments, the system may base its data path selection (i.e., selection between a NAS path and a SAN path) on one or more parameters derived from the client device and/or a host process executing on the client device, and/or may base its path selection on one or more parameters of other components of the computer system. For example, in some embodiments of the invention, a parameter on which data path type selection is performed is whether the operation to be executed is a read or write operation (i.e., the type of the I/O operation). As another example, a parameter on which a path selection type may be based is whether the information to be read and/or written is expected to be in the cache of the file system server. As a further example, a parameter on which a data path type selection is made may be any performance characteristic of any element of the computer system (e.g., an average response time of a file system server or other characteristics). In some embodiments, the path selection factors (including parameters) may be changed dynamically at any time, may be changed globally for all operations by the client device(s), may be changed for only a specific I/O operation or for a specific length of time, or may be changed at any other period of time or for any set of operations, as the aspects of the present invention related to dynamically adjusting the path selection factors are not limited in this respect.

Figure 2:
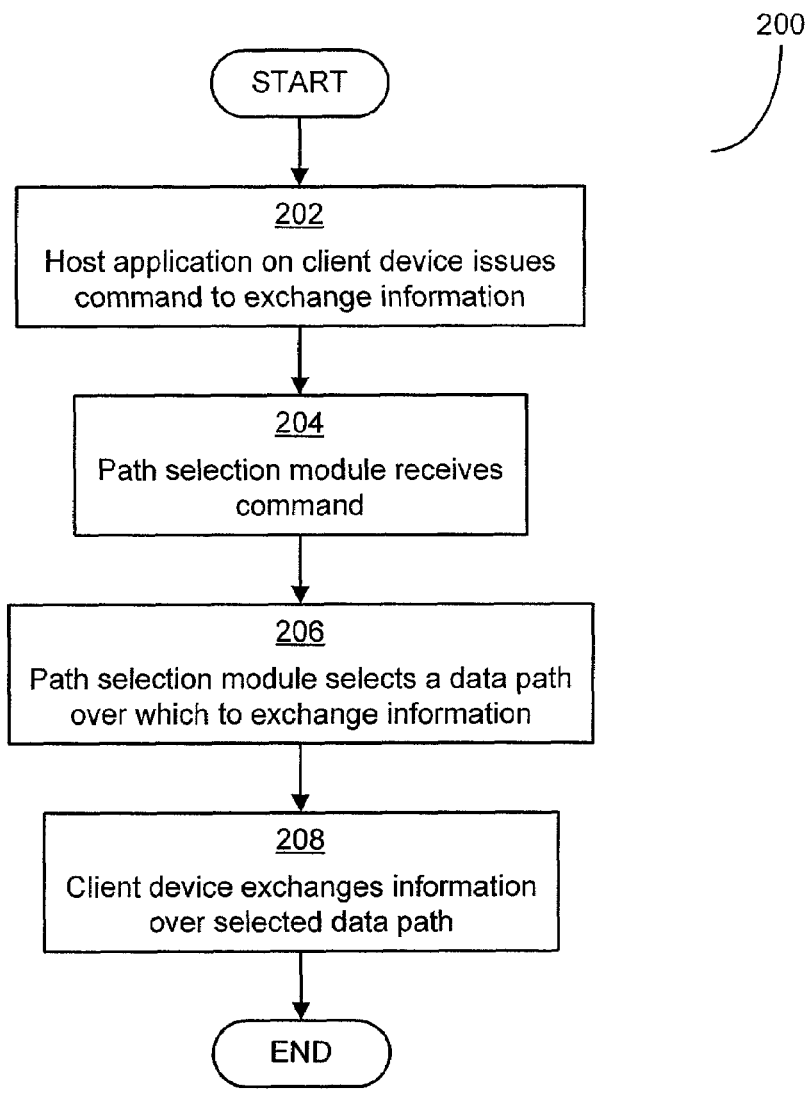
FIG. 2 is a flowchart of an exemplary process by which a client device may exchange information with a storage system server over one of two possible data path type, in accordance with one embodiment of the invention.

FIG. 2 shows an overall process 200 which may be executed by a computer system to exchange information between a client device and a storage system, in accordance with one or more embodiments of the invention. Exemplary computer systems in which processes such as process 200 may act are discussed in greater detail below in conjunction with FIG. 3.

Process 200 begins in block 202, when a host application executing on a client device issues a command to exchange information with a storage system (making the command an I/O operation) by, for example, accessing a file in the file system stored on the storage system. Accessing the file (or otherwise exchanging information in any other suitable manner) may comprise reading and/or writing information to the file. The information which is read and/or written may comprise any suitable information, such as data and/or executable instructions. The host application may be any suitable application which may be executing on a client device and seeking to exchange information with the file system. For example, a host application exchanging information with the file system may be a word processing application writing to the file system updates to documents which a user has edited, a web server reading from the file system web pages to be served, a database client querying and updating a database stored in one or more files in the file system, or any other suitable host application exchanging any other suitable information.

In block 204, a path selection module receives the command to be executed, which was issued in block 202. The path selection module may be implemented in any suitable way that enables it to see I/O operations directed to the file server. For example, the path selection module may be implemented on the client device, on the file system server, or on any other component of a computer system which may see and process I/O operations issued by the client device to be received by the file system server, as the embodiments of the present invention described herein are not limited in this respect. In the description below, the path selection module is described as being implemented on the client device, but it should be appreciated that this description is merely illustrative.

In block 206, the path selection module selects a data path type from among the NAS data path type and the SAN data path type over which to exchange the information with the storage system (e.g., access the file). Exemplary data paths are discussed below in conjunction with FIG. 3. To select a data path type, the path selection module may apply any suitable parameters and examine any suitable information, examples of which were discussed above and others of which are discussed in greater detail below, to determine which data path type should be employed to handle the I/O operation. For example, in some embodiments, the path selection module may examine for a read operation the likelihood that the information requested is in a cache of the file system server, in which case requesting the information from the file system server may be faster than requesting the information directly from the storage system. In some embodiments, the path selection module may additionally or alternatively evaluate the response times of other, recently-executed commands. In this embodiments, if it is determined that the file system server is under heavy load (from, for example, being accessed by multiple client devices at the same time), it may be more efficient to retrieve the information from the storage system directly than to wait for the file system server to execute a read command. Accordingly, the path selection module may examine parameters and information (including, for example, these illustrative parameters and/or other parameters) and make a selection of a data path type over which to exchange information.

In some embodiments, the data path selection module does not select a specific connection (e.g., network link) over which to exchange information (e.g., access a file) when multiple connections of the same type exist, but may only select a path type. As discussed in greater detail below, in some computer systems in which embodiments of the invention may be implemented, a NAS path and/or a SAN path may be implemented as a plurality of parallel connections. For example, a direct SAN path between a client device and a storage system may not be a single direct connection, but may include two or more direct connections. In some embodiments, the data path selection module may not select a particular connection or network link over which to exchange information, but rather may only select, in general, between the NAS path and the SAN path. Conventional techniques, such as techniques implemented by the above-referenced PowerPath path management system available from EMC Corporation, may be implemented by some embodiments of the invention to select one or more individual connections/links over which to exchange information once the path selection module has selected between the NAS path and the SAN path. However, it should be appreciated that the embodiments of the invention described herein are not limited in this respect, and that a path selection module may be employed that not only selects between a NAS and SAN type path, but that also selects one or more specific links of the selected type over which to process the I/O operation.

In block 208, a storage driver (or other suitable component in the client device) exchanges the information over the selected data path (i.e., retrieves the desired information from the storage system and/or writes the desired information to the storage system), and the process ends.

It should be appreciated that process 200 is merely exemplary of the types of processes that may be executed according to embodiments of the invention, and that some embodiments of the invention may execute different processes for exchanging information with a storage system. For example, while process 200 was discussed in the context of a host application exchanging data with a storage system, and interacting with a path selection module to select a path type (e.g., via the NAS file server or SAN interface) to carry out the exchange, in some embodiments of the invention the host application and the path selection module may be the same piece of software or same application (e.g., the path selection module functionality may be incorporated into the host application). In alternative embodiments, the path selection module may interact with the storage system, NAS file server, or other system components such as in cases where a path selection module retrieves information useful in selecting a data path type (e.g., performance characteristics of components of a computer system) from the storage system or elsewhere.

It should also be appreciated that a path selection module may be implemented in any suitable manner. A path selection module may be any suitable software program or programs, and may be implemented on a client device, on a file system server, or on any other suitable component of a computer system. Additionally, a path selection module is not limited to being implemented on any single component of a computer system, but may in some embodiments be implemented as a distributed module executing on a plurality of components of a computer system (e.g., a plurality of client devices and/or file system servers) and jointly processing information on each of the plurality of components.

Additionally, it should be appreciated that while block 206 was discussed in conjunction with exemplary techniques for making a selection of a data path type over which to communicate data, and exemplary parameters that may be used in making the selection were discussed, any suitable technique may be used and any suitable parameters and information may be considered in selecting a data path type—between a NAS path and a SAN path—over which to exchange information. Other exemplary parameters and techniques are discussed in greater detail below.

Figure 3:
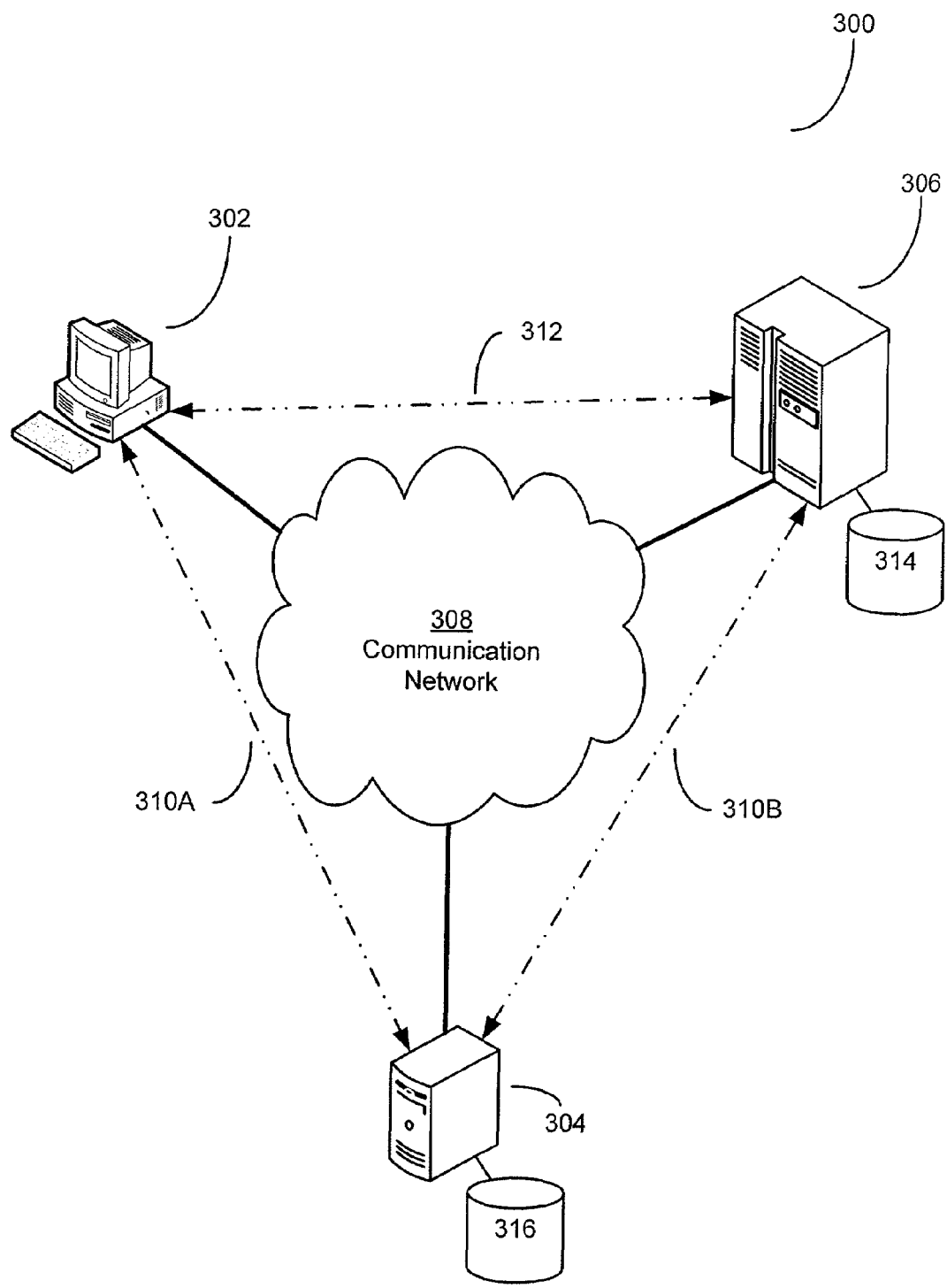
FIG. 3 is an exemplary computer system in which embodiments of the invention may be implemented.

FIG. 3 shows an exemplary computer system 300 in which embodiments of the invention may be implemented. It should be appreciated, however, that the computer system 300 is merely illustrative and that the aspects of the present invention described herein can be implemented on any of numerous computer system configurations.

The computer system 300 of FIG. 3 comprises a client device 302, a file system server 304, and a storage system 306. Client device 302 may be any suitable computing device adapted for a specific purpose or for multiple purposes, and may, in some embodiments, be adapted for use by a user. While in FIG. 3 client device 302 is shown as a desktop personal computer, it should be appreciated that client device 302 is not limited to being implemented as such, but may instead be implemented as a laptop personal computer, a server (e.g., web server, mail server, etc.), a stand-alone networking device (e.g., a firewall, router, switch, network-address translator, etc.), or any other suitable computing device adapted to execute a process which may seek information from an external storage system. As discussed above, the client device 302 may be executing one or more pieces of software, such as a host application and/or software facilitating communication with the storage system 306 and the NAS file system server 304, and/or a path selection module for selecting a data path over which to exchange information with the storage system or NAS file system server.

The storage system 306 may be any suitable storage system having any one or more associated storage medium or media (e.g., storage media 314) storing information thereon. For example, the storage system 306 may be a disk array comprising a plurality of disk storage media, or a system having other types of storage media. The storage system may store any suitable information comprising data and/or executable instructions, and may be formatted and structured in any suitable manner. One exemplary file system server that may be employed is the Celerra MPFS discussed above, and an exemplary storage system with which embodiments of the invention may be used is the CLARiiON storage array available from EMC Corporation, though it should be appreciated that the aspects of the present invention described herein can be used in system configurations using any suitable type(s) of file system servers and storage systems.

Computer system 300 further includes a file system server 304 providing a file system (or network attached storage (NAS)) interface for the information stored on storage system 306. File system server 304 may manage any suitable file system, such as a Network File System (NFS) or a file system using the CIFS protocol. The file system server 304 may maintain, on a data store 316, metadata regarding information stored on the storage system 306. The metadata maintained by the file system server 304 may comprise any suitable information about the storage system 306, such as, for example, metadata describing where information is stored on the storage system 306. Metadata may be any suitable data about the information, such as a size of a particular content unit of information and/or a location of the information on the storage system 306 (e.g., which blocks on a logical volume of storage on the storage system 306 store the information).

The file system server 304 may receive requests to exchange information (e.g., requests to access files) stored in the storage system 306. For read requests, the file system server 306 may retrieve a requested file (or other information) from the storage system 306 and provide the file to the requesting party (e.g., a client device of the computer system). The file system server 304 may also maintain one or more caches (not shown). The cache can be updated in any way, as embodiments of the invention are not limited to being used with systems having caches of any particular type. As an example of the types of caches which may be implemented by a file system server 304, recently-requested information, often-requested information, and/or information selected based on any other suitable criteria may be stored in one or more caches. The file system server 304 may, in some cases, directly provide information to a requesting party from the cache without retrieving the information from the storage system 306. A file system server 304 that maintains such cache(s) may also maintain metadata regarding what information is stored in the cache(s).

As discussed above, the file system server 304 may also be adapted to provide to a requesting party, instead of requested information (e.g., a file), metadata regarding where the requested information is stored in the storage system 306. In this manner, a requesting party (e.g., a client device) may retrieve from the file system server 304 metadata comprising a location of information (e.g., a location of a file) on the storage system 306 and then retrieve the information directly from the storage system 306 (rather than have the file system server 306 retrieve the information, then provide it to the requesting party). An example of such a system is the Celerra Multi-Path File System (MPFS) (also known as the High- Road system) available from EMC Corporation. However, it should be appreciated that embodiments of the invention are not limited in this respect, and may be used with any file system server capable of also returning to a client device the metadata to access a file directly from the storage system.

While FIG. 3 shows the computer system components as single units, the aspects of the invention described herein can be used in computer systems that may comprise a plurality of client devices, a plurality of file system servers, and/or a plurality of storage systems. The plurality of clients devices, file system servers and/or storage systems may be implemented as distributed systems or clusters of computing devices, each sharing processing load. Additionally, it should be appreciated that while FIG. 3 shows the file system server 304 and storage system 306 each being connected to the communication network 308 via a single connection, the file system server 304 and/or storage system server 306 may be connected to the communication network 308 via any suitable number of connections (i.e., via a plurality of parallel network links). In such embodiments, these connections may be used for executing a plurality of operations in parallel (e.g., processing two or more read operations at a given time), or may be used for executing a single operation more quickly (e.g., providing different portions of a result of a single read operation in parallel). As discussed above, it should be appreciated that, in some embodiments, a data path type selection does not comprise selecting an individual link of a data path over which to exchange information, but rather comprises selecting between a first data path type (i.e., via a file system server 304) and a second data path type (i.e., direct to the storage system 306). In embodiments of the invention which do implement a data path as a plurality of parallel network links, once a data path type has been selected according to any suitable technique (such as the exemplary techniques described herein), any suitable technique may be implemented to select the network link(s) of the data path over which to exchange information (including techniques implemented by the PowerPath link management system available from EMC Corporation or any other suitable technique).

Each of the system components is connected to a communication network 308. The communication network 308 may be any suitable wired and/or wireless communication medium or media for exchanging data between two or more computers, including a private or public network (e.g., the Internet). For example, the communication network 308 may be, at least in part, a wireless network operating according to any suitable wireless networking protocol, or may be, at least in part, a wired network operating according to any suitable wired networking protocol, such as Ethernet or Fibre Channel Protocol (FCP).

While information may travel between the components of the computer system 300 in any suitable manner through the communication network 308 (i.e., over any particular network link or combination of network links), the client device 302 may be thought of as connected to the storage system 306 via two types of distinct data paths (though there can be multiple parallel links of each type). A first data path type, comprising the abstract links 310A and 310B, passes through the file system server 304, and may be referred to as the network-attached storage (NAS) path. Over this first data path type, a client device 300 may request information (e.g., files) from the storage system 306 via the file system server 304. The file system server may, upon receiving a request for a file (or other information) from the client device 302, retrieve from its data store metadata regarding the requested file (including, for example, location(s) at which the desired information is stored on the storage system 306), retrieve the information from the storage system 306 according to the metadata, and then provide the information to the client device 302. Alternatively, if the requested file exists in a cache of the file system server 304, the file system server 304 may provide the file to the client device 302 without retrieving the file from the storage system 306. Additionally, a client device 302 may write a file to the file server, and the file system server 304 may store the information of the file on the storage system 306.

Alternatively, the client device 302 may request information directly from the storage system 306 over a second data path type, comprising abstract link 312, which may be referred to as a storage area network (SAN) path. Over the second data path type, the client device 302 may transmit to the storage system 306 information to be written to the storage system, or may transmit a read request for information to be retrieved and provided to the client device 302. To perform such an operation on a file, the client device 302 may use information about the structure and format of how the file is stored on the storage system 306. For example, to read a file (or other information) from the storage system 306, or to write a file to the storage system 306, the client device may use information about where the file is located on the storage system 306 (i.e., from or to where the information should be read or written). A client device 302 may request from the file system server 304 (over first data path 310A) metadata for a file specifying where the information in the file is to be read from or written to in the storage system 306, and then may directly access the storage system 306 (over second data path 312) using the metadata provided by the file system server 304.

In some embodiments of the invention, the physical connections used to implement first data path type (i.e., the NAS data path) and second data path type (i.e., the SAN data path) may be substantially similar save for the interaction with the file system server 304. In other words, the network links over which the information travels may be similar. In other embodiments, however, the network links of the first data path type may be completely separate from the network links of the second data path. For example, in one embodiment of the invention, abstract links 310A and 310B may be Ethernet network links, while abstract link 312 may be a fiber optic network. In such embodiments, then, there may not be a single communication network 308 over which information is exchanged. Instead, communication network 308 may be implemented as two or more communication networks. Alternatively, one of the types of data paths may be implemented in a communication network, while the other type of data path may be a direct connection consisting of a single link. For example, the first data path type may be implemented in an Ethernet network, but the second data path may be a direct, single-link fiber optic connection between the client device 302 and the storage system 306. It should be appreciated that the first and second types of data paths may be implemented in any suitable manner, as embodiments of the invention are not limited in this regard. Further, as discussed above, each data path may be implemented as a plurality of connections/links in some embodiments of the invention. For example, the SAN data path between the client device 302 and the storage system 306 may be implemented as a plurality of parallel links such as a plurality of parallel, direct fiber optic channels.

As discussed above, a path selection module operating according to some embodiments of the invention may implement one or more techniques for selecting between data path types when determining how to exchange information (e.g., access files) in a file system implemented via a file system server 304 and stored on a storage system 306 to which the client also has direct (i.e., not through the file system server 304) access. In conventional systems of this type, a data path type was selected based purely on a fixed threshold amount of data, i.e., small files were accessed via the first data path (through the file system server) and larger ones were not. Applicants appreciated that this technique is not optimum in all situations because it does not take into account other properties or characteristics of the computer system.

In accordance with some embodiments of the invention, data path type selection may be based on any suitable parameter(s) and/or information about the client device initiating an access request and/or about the computer system in which the client device is acting. Exemplary techniques for selecting a data path type based on information about a client device and/or about the computer system in which the client device is acting are discussed below. It should be appreciated, however, that these techniques are merely illustrative. Embodiments of the invention are not limited to implementing any specific technique, but rather may implement any suitable technique and consider any of the parameters (or any combination thereof) discussed herein, to select a data path type.

Figure 4:
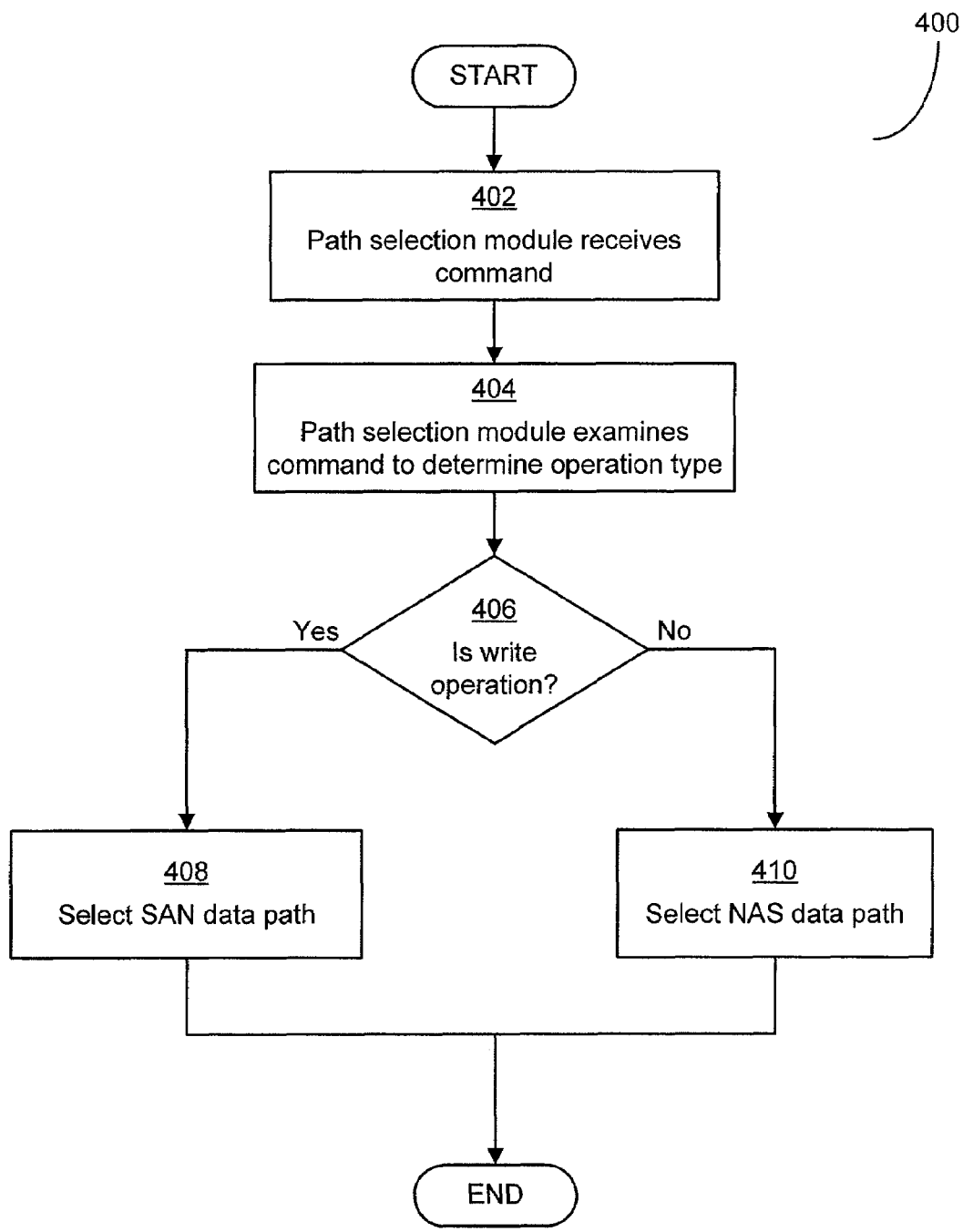
FIG. 4 is a flowchart of an exemplary process for selecting a data path type over which to exchange information according to a type of an operation to be executed, according to one embodiment of the invention.

FIG. 4 shows one exemplary technique which makes use of information other than (or in addition to) the size of a file in making a selection of a data path type over which to exchange information between a client device 302 and a storage system 306. It should be appreciated, though, that the technique of FIG. 4 is merely illustrative, and that embodiments of the invention are not limited to implementing the exemplary technique shown in FIG. 4. Alternative and additional techniques which may be implemented are discussed in further detail below, but those techniques also are provided merely for illustrative purposes as other techniques are possible in accordance with some embodiments of the invention.

Process 400 begins in block 402, wherein a path selection module receives a command issued by a client device to exchange information with the storage system 306. This command may, for example, seek to access a file managed by the file system (e.g., the file system server 304 of FIG. 3). The command may be received from a host application executing on the client device 302, and may be detected by any component of the computer system and presented to the path selection module. In one embodiment, the path selection module may reside on the client device in any location where it may see access requests to the file system. It should be appreciated, however, that all embodiments are not limited in this respect, as the path selection module can be implemented on any component of the computer system (e.g., on the file system server or elsewhere).

In block 404, the path selection module evaluates the received command to determine a type of the I/O operation. More specifically, the path selection module evaluates the I/O operation to determine whether the operation is a read operation, meaning it is seeking to read information from a file, or a write operation, meaning it is seeking to write information to the file.

If in block 406 it is determined that the I/O operation is a write operation, then in block 408 the path selection module selects the direct data path type that does pass through the file system server 302 (i.e., the second data path or SAN data path). If, however, the I/O operation is a read operation, then in block 410 the path selection module selects the data path type that passes through the file system server (i.e., the first data path or NAS path) to process the I/O operation.

Once a data path type is selected in either of block 408 or 410, the process 400 ends. Ending the process may comprise any suitable act, such as providing an indication of the selected data path to another component of the computer system. In this respect, the aspects of the present invention described herein are directed to techniques for selecting between a first data path type (a NAS data path) and a second data path type (a SAN data path) based upon one or more novel selection criteria, but the aspects of the present invention described herein are not limited in any way by the ways in which accesses are coordinated by the client device, file system server, and storage system over the different data paths. For example, in a computer system employing the Celerra MPFS system, a protocol is established for communicating between the file system server 304 and the client device 302 to control access over the direct data path to the storage system (i.e., the second data path or SAN data path), and path selections are made based on the size of the file. In one embodiment, the path selection module can replace the component in that system that performs data path selection, but the invention is not limited in this respect, as the path selection module can communication the selected data path to any suitable entity in the computer system.

The selection based on operation type (i.e., whether the operation is a read operation or a write operation) may be employed in some configurations for any of numerous reasons. For example, it may be assumed that multiple client devices in the computer system may seek to read the same or similar information (e.g., files) from the storage system around the same time. In addition, related files may be stored in the same blocks of the storage system 306, such that when the storage systems 306 returns information to the file system server in response to a read request, it may also return other information or related files if the other information or related files are stored in the same blocks on the storage system 306. Thus, as client devices may often seek to read related files around the same time, for any read request there is a possibility that the information requested (e.g., the requested file) may be in the cache of the file system server 304. If the information is in the cache of the file system server 304, then it may be faster to retrieve the information from the cache (via the first data path) than to retrieve the metadata for the information from the file system server 304 and then retrieve the information directly from the storage system 306 (via the second data path).

While the path selection module may not be certain that optimal performance will be achieved by performing a specific read operation through the first data path (i.e., NAS data path) rather than via the file system server 304, by determining to perform all read operations through the first data path, the path selection module may assume that over time, the overall performance of the computer system (e.g., the overall efficiency of all the client devices) may benefit from that decision.

Furthermore, as discussed above, modern storage systems are capable of executing a read operation in approximately one-third the time required to execute a write operation. If a buffer on a data path in a conventional system contains one write operation at the top of the stack and three read operations behind it, then those three read operations may need to wait for the write operation to be fully executed before any of the read operations could be executed. Assuming that a read operation takes T milliseconds to execute, then this sequence of operations would take 6T milliseconds to execute (3T for the write operation and 1T for each of the three read operations, executed in succession). However, if the read operations were processed on a separate data path than the write operation, and executed in parallel, then the three read operations could finish executing at about the same time as the one write operation. The overall time to complete the four operations would therefore be 3T milliseconds; 3T for the write operation, and, at the same time as the write operation is executing, 1T for each of the three read operations. Thus, by separating the read operations from the write operation in this example, the four operations could be completed in half the time. This benefit may be scaled to the overall system if all read operations were handled on one of the paths, such as the first data path 310A/310B of FIG. 3 (i.e., the NAS data path), and all write operations were handled on the other, such as the second data path 312 of FIG. 3 (i.e., the SAN data path).

It should be appreciated, however, that the assumption that files (or other information) being read often may be in the cache of the file system server 304 may not apply to all computer systems, because in some configurations each client device may be executing substantially different applications and therefore may not be reading the same or related files around the same time.

Figure 5:
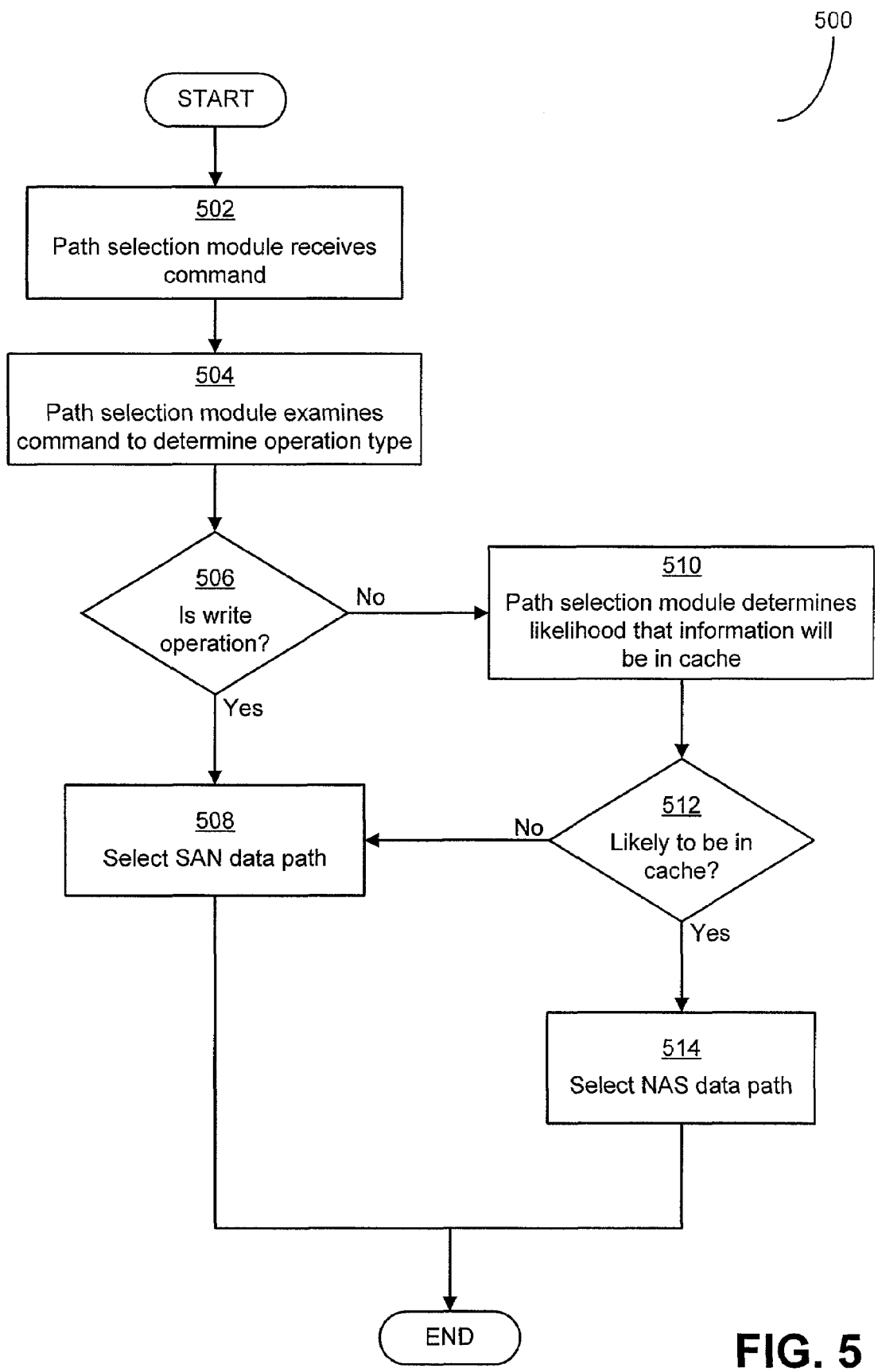
FIG. 5 is a flowchart of an exemplary process for selecting a data path type over which to exchange information according to a likelihood that the information will be in a cache of a file system server, according to one embodiment of the invention.

Thus, in accordance with one embodiment, Applicants have appreciated that it would be beneficial in making a path selection to know whether the information being requested is definitively in the cache of the file system server 304, or at least is likely to be. FIG. 5 shows a second exemplary process for selecting a data path between the first/NAS data path and the second/SAN data path based on information about the computer system in which a client device is operating. In the exemplary process 500, the information which is evaluated relates to whether the desired information to be exchanged (e.g., the requested file) is likely to be in a cache of the file system server 304.

Process 500 begins in block 502, in which the path selection module receives a command to access a file (or any other suitable information). In block 504, the path selection module evaluates the received command to determine a type of the I/O operation (i.e., whether the operation is a read operation or a write operation). If it is determined in block 506 that the I/O operation is a write operation, then the second/SAN data path may be selected in block 508, as in the process 400 of FIG. 4, and the process ends. If, however, the I/O operation is a read operation, then in block 510 the process 500 determines the likelihood that the file being requested by the read operation is in the cache of the file system server 304.

The determination in block 508 of whether the requested information is likely in the cache may be made in any suitable manner based on any suitable information. For example, in some embodiments of the invention, the path selection module may query the file system server 304 requesting that the file system server 304 inform the path selection module whether the requested file is in the cache. If the file system server 304 responds positively, then the path selection module may determine that it is likely that the information is in the cache (i.e., the likelihood is 100 percent). This embodiment may be particularly advantageous when the path selection module is implemented in the file system server 304, but it can be used no matter where the path selection module is implemented.

In some embodiments, rather than querying the file system server for a definitive determination of whether the requested file is in its cache, the path selection module may make an assessment of the likelihood based on other information. For example, the path selection module may determine whether the file has been requested from the file system server 304 in the recent past (within a threshold amount of time) and, if so, may determine a likelihood of whether the file is still in the cache of the file system server 304. For example, if the file was requested from the file system server 304 within the last T milliseconds, then the path selection module may determine that it is very likely that the information is still in the cache, but if the information was requested 2T milliseconds ago, the path selection module may determine that it is only somewhat likely that the information is still in the cache, and if the information was requested 3T milliseconds ago, the path selection module may determine that it is not likely that the information is in the cache. These are merely examples of the ways the path selection module can use information from the computer system to dynamically determine a likelihood that a requested file is in the cache. It should be appreciated that embodiments of the invention are not limited to implementing these techniques, as embodiments of the invention may make a determination of whether a file is likely to be in a cache of the file system server 304 in any suitable manner.

In some embodiments of the invention, the path selection module may evaluate not just the recent I/O operations of a requesting client device 302 when evaluating whether a file is likely to be in a cache of the file system server 304, but may additionally or alternatively evaluate the operations of other client devices in the computer system. For example, if other client devices in the computer system are executing the same or similar operations as the requesting client device 302, the path selection module may consider it more likely that the requested file is in a cache of the file system server 304 than if the other client devices are executing operations dissimilar to the operations being executed by the requesting client device 302. The path selection module could determine what operations are being executed by the other client devices in any suitable manner, such as by querying a host application that issued the I/O operation which is seeking to access the file for information it has about the other client devices. For example, if the host application is aware that it is in a distributed processing cluster with the other client devices, each of them processing a piece of a single overall process, then the path selection module may determine that it is likely that the other client devices are processing the same or similar information as the requesting client device 302, and thus may determine that it is likely that the requested file is in a cache of the file system server 304. Alternatively, the path selection module can query the other client devices to determine the operations they are executing and the files they have recently accessed. Just as the path selection module can query the file system server 302 to determine whether a requested file is in the cache, the path selection module can query the other client devices to determine if another client device had recently requested the file. As another example, the path selection module could infer, based on the number of other client devices in the computer system, whether it is likely that the file was recently requested and thus whether it is likely that the file is in the cache of the file system server 304. For example, if there is only a small number of other client devices, it may be unlikely that another client device had recently requested the file, but if there is a large number of other client devices, the likelihood that at least one other client device recently requested the file may be greater.

In some embodiments of the invention, rather than examining operations executed by the requesting client device 302 itself or by other client devices in the computer system, the path selection module may examine one or more performance characteristics of the file system server 304 to infer whether a requested file (and/or other requested information) is likely in the cache. A performance characteristic may be any suitable characteristic of a component of the computer system (e.g., the file system server 304) and may be used in any suitable manner to make any suitable determination. Other exemplary performance characteristics and techniques for evaluating them to make a path type selection are discussed in greater detail below.

For example, one performance characteristic of the file system server 304 which may indicate whether or not a requested file is likely in a cache is the response time for accesses via the first/NAS data path. By evaluating response times for I/O operations over the NAS/first data path over a given period of time, the path selection module can identify operations that were executed so quickly that the requested file(s) (and/or other information) must have been serviced through a cache of the file system server 304 (i.e., for which operations the information and/or file(s) were located in the cache). If the path selection module determines that, over some period of time, the file system server 304 is responding to requests so quickly that the file system server 304 is often finding the information in its cache, the path selection module may assume that the likelihood that the file(s) (and/or other information) requested next is/are in the cache as well is high. The time period evaluated can be any suitable time period. For example, it may be relatively short (e.g., for the last few I/O operations that may be assumed to be related to a next I/O operation), or a longer period to provide a more comprehensive view of an average cache hit rate in the cache(s) of the file system server 304. Thus, it should be appreciated that this aspect of the present invention is not limited to being implemented with any particular technique and/or time span for evaluating response times of a file system server 304.

Alternatively, rather than the path selection module inferring a performance characteristic indirectly, the characteristic may be provided to the path selection module directly. For example, a file system server 304 may make available to the path selection module its cache hit rate, which indicates the percentage of requests for information (e.g., files) for which the information (e.g., files) was found in a cache. Thus, the path selection module may examine the cache hit rate and determine from it whether it is likely that a requested file (and/or other information) will be in the cache (e.g., if a cache hit rate is 80 percent, the information may be likely to be in the cache, but if the cache hit rate is 20 percent, the information may not be likely to be in the cache). It should be appreciated that, as discussed below in greater detail, a cache hit rate is only one example of a performance characteristic that may be directly provided to the path selection module, as others are possible.

As another example, the path selection module may examine characteristics of the information requested as well as characteristics of the cache itself to make a determination as to whether the information is likely to be in the cache. For example, if a client device 302 is seeking to read a ten gigabyte file, and the cache of the file system server 304 can store only one gigabyte of information, then the path selection module may recognize that the file cannot be fully serviced from the cache (because the information could not fit in the cache), and thus the file is not likely to be in the cache.

In block 512, if the likelihood determined in block 508 is above a threshold, the path selection module will select in block 514 the first/NAS data path as the data path to service the read operation based on the likelihood that the file (and/or other information) is in the cache. If the likelihood is below the threshold, then the path selection module in block 508 will select the second/SAN data path as the data path over which to service the read operation. Once a data path type is selected, then the process ends, and (as in block 208) the path selection module may notify any other appropriate component of the system which will facilitate execution of the I/O operation over the selected data path type.

The decision in block 512 may be made in any suitable manner. For example, the path selection module may have a threshold of sixty percent likelihood for choosing the first/NAS data path (and trying to take advantage of the cache), but this is merely an example, as any threshold can be used. If the file system server 304 has an eighty percent cache hit rate, then path selection module may select the first data path and attempt to take advantage of the cache of the file system server 304. If, however, the cache hit rate is twenty percent, then the path selection module may select the second/SAN data path, because the information is unlikely to be in the cache and it may be faster to exchange the information directly with the storage system 306 in cases where the file(s) (and/or other information) is/are not in a cache of the file system server 304.

It should be appreciated that the process 500 of FIG. 5 is merely exemplary and that other techniques for selecting a data path type between a first/NAS data path and a second/SAN data path in accordance with embodiments of the invention are possible. Additionally, it should be appreciated that the types of information described above in conjunction with blocks 510 and 512 that may be evaluated by embodiments of the invention are merely illustrative of the types of information that may be evaluated, as other types of information may additionally or alternatively be evaluated. Additionally, while the types of information described above are described distinctly, any two or more of these types (or other types) of information may be evaluated together to determine the likelihood that information may be in the cache. For example, the path selection module may evaluate the operations executed by the client devices in the computer system other than the client device which issued the I/O operation and determine based on that fact alone that it is unlikely that the information will be found in the cache, but may also examine a cache hit rate for the file system server 304 and determine that it is likely based on that fact alone that the information will be found in the cache. The client device 302 may then weigh these two determinations and determine an overall likelihood. The overall likelihood may be determined in any suitable manner, such as by setting weights for various terms in a calculation that may be made. Weights may be assigned for any suitable reason, such as certainty of a term in the calculation (e.g., an estimate made based on the number of client devices in the computer system may be less reliable, and therefore may be weighted less, in a calculation of overall likelihood, than other factors such as historical cache hit rate).

As mentioned above, one embodiment of the invention is directed to making a dynamic determination of whether to service an I/O operation via a NAS or SAN data path, rather than based upon a static determination based on file size as was done in the prior art. Any performance characteristic of any component of a computer system may be evaluated in making a determination of which data path to employ, as this aspect of the invention is not limited in this respect.

A performance characteristic may be any information relating to any one or more components of the computer system which may affect the performance of handling an I/O operation in the computer system, and may include information about the one or more components, about sets of operations and/or individual operations handled by the component. For example, a cache hit rate for a component (e.g., a cache hit rate for the file system server or a cache hit rate for the storage system), a response time for a component, and/or a cache size for a component may be evaluated. Additionally, operations recently executed by one or more components of the computer system (e.g., operations recently executed by a requesting client device) may be a performance characteristic that can be evaluated, as the operations may serve as an indication of a likely cache hit rate. Other performance characteristics may include a load rate of a component (i.e., a percent utilization of the component), a bandwidth of a data path to the component, or other characteristics.

Figure 6:
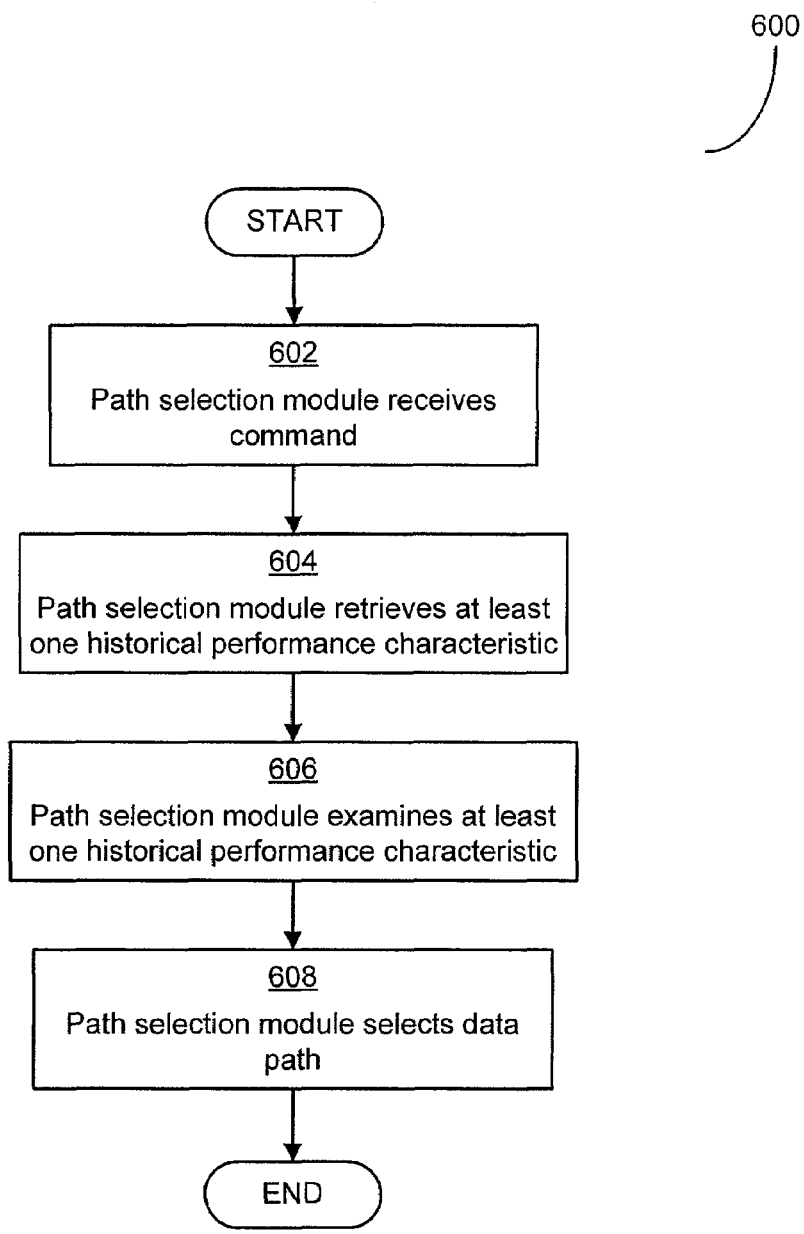
FIG. 6 is a flowchart of an exemplary process for selecting a data path type over which to exchange information according to performance characteristics of one or more components of a computer system, according to one embodiment of the invention.

FIG. 6 shows an exemplary process for selecting a data path type between a first/NAS data path and a second/NAS data path over which to service an I/O operation based on at least one performance characteristic associated with the computer system. It should be appreciated that the process of FIG. 6 is merely exemplary of techniques which may be implemented by embodiments of the invention, and that the type(s) of performance characteristics described are merely illustrative of the type(s) which may be examined by embodiments of the invention. Accordingly, it should be appreciated that embodiments of the invention are not limited to implementing the exemplary process shown in FIG. 6, as any process can be employed that evaluates one or more performance characteristics of the system.

Process 600 of FIG. 6 begins in block 602, wherein the path selection module receives a command to access a file (and/or other information). In block 604, the path selection module retrieves at least one performance characteristic of the computer system. This may be done in any suitable way. For example, information on the (at least one) performance characteristic may be retrieved from a data store of the client device 302 (e.g., the performance characteristic relates to characteristics of the client device 302 itself such as recently-executed operations). Alternatively, the path selection module may maintain a data store of such information on the performance characteristics of any one or more components of the computer system. Alternatively, retrieving the characteristics in block 604 may comprise requesting the characteristic from at least one other component of the computer system, including components that have information on their own particular parameters.

In block 606, the path selection module examines the at least one performance characteristic. Examining may comprise any one or more actions related to evaluating the performance characteristic. For example, if the performance characteristics is a cache hit rate (e.g., of a cache in the file system sensor), evaluating the cache hit rate may comprise determining whether the cache hit rate is sufficiently high to make it likely that requested information is in the cache. As another example, if the performance characteristic is a size of a file system server cache, then examining the performance characteristic may comprise determining whether the amount of information to be requested is larger than the file system server cache (thus making it likely that the information is not in the cache). As a further example, if the performance characteristic is a load rate on a file system server 304 (i.e., percent utilization of the file system server) then examining the performance characteristic may comprise determining whether the load rate is so high that the likelihood that the file system server will be able to timely handle any I/O operation is low, and thus determining whether it is more efficient to exchange information with the storage system rather than the file system server. These are merely examples of the ways those parameter performance characteristics may be evaluated.

Any suitable performance characteristic or characteristics may be evaluated by embodiments of the invention, relating to any combination of various type(s) of characteristics and/or types of components to which they relate (rather than only one performance characteristic, only one type of performance characteristic, or performance characteristics for only one component). For example, examining a performance characteristic may comprise comparing a load rate for a storage system 306 and a load rate for a file system server 304 to determine which component has more available resources to handle an I/O operation (and thus which will be able to execute an operation more timely and more efficiently).

As another example of the types of characteristics that may be examined in block 606, a load rate of a file system server 304, a cache hit rate of the file system server 304, and/or a bandwidth of the SAN data path to a storage system 306 may be examined to determine whether better performance in servicing a particular I/O operation is likely to be achieved over the SAN data path or over the NAS data path. For example, if the file system server 304 has a high cache hit rate (suggesting that I/O may be serviced quickest by the file system server 304 if the file is in the cache), but a high load rate (suggesting it may be more efficient to access information directly from the storage system 306 via the SAN data path to avoid waiting for an operation to be executed by the file system server 304), the path selection module may weigh these factors against a bandwidth of the SAN data path. If the bandwidth of the SAN data path is low, then it may be worth waiting whatever time is necessary to gain the benefit of the cache of the file system server 304, but if the bandwidth of the SAN data path is high, then it may be quicker to use the SAN data path than wait for the file system server 304 to execute an operation.

Both the types of performance characteristics described and the specific ways in which they are evaluated are merely exemplary, as it should be appreciated that each performance characteristic can be evaluated and/or weighted in any suitable way and that the embodiment of the invention directed to evaluating a performance characteristic of the system is not limited to the specific examples shown, and can evaluate any suitable performance characteristic, some of which may relate to past historical performance of the system, others of which may relate to attributes of the system that are unrelated to any particular I/O operation, etc.

In addition, it should be appreciated that the embodiment directed to evaluating a performance characteristic is not limited to selecting a path seeking to maximize the performance of the particular I/O, but rather can seek to maximize performance of overall system operation, even at the expense of selecting a path for a particular I/O that is not expected to maximize its performance.

In block 608, based on this examination of the at least one performance characteristic, a data path type is selected. Once a data path is selected the process ends in much the same manner as described above in connection with FIGS. 2, 4 and 5.

As discussed above, some embodiments of the invention are directed to selecting between a NAS data path and a SAN data path for a data path over which to exchange information with maximum efficiency. This selection may be made in any suitable manner according to any suitable process, including by any of the exemplary processes discussed above. Some processes executed by embodiments of the invention may include fixed parameters, such as all read operations exchange information over a first data path type (e.g., the NAS path) and all writes exchange information over a second path type (e.g., the NAS path), while others may operate using threshold levels, such as a threshold level of likelihood that information will be in a cache of a file system server. Some embodiments of the invention which evaluate one or more parameters or threshold levels may be adapted to change those parameters and/or threshold levels dynamically (i.e., without restarting the device(s) on which the path selection module is implemented and/or software related to it such as a driver) and/or over time to adjust to changing conditions in the computer system. Additionally or alternatively, the path selection module may be adapted to change the path selection factors it evaluates to adjust to changing conditions in the computer system.

For example, assume that an illustrative computer system includes a file system server 304 that, at a particular point in time, consistently has a low cache hit rate. Accordingly, the path selection module may be programmed to weight less (or not evaluate) in a path selection process the likelihood that information will be in the cache. However, due to changes in the computer system (e.g., the client devices executing different applications processing different information), the cache hit rate on the file system server 304 may increase to a sustained high level. A path selection module may be adapted to recognize this increase in cache hit rate in some way and adjust the path selection factors it applies in making a selection of a data path type over which to access files and/or exchange information. Adjusting path selection factors may comprise any suitable adjustment, such as adjusting parameters of a decision (e.g., adding cache hit rate), adjusting a threshold for a parameter (e.g., lowering the acceptable cache hit rate), and/or adjusting a weighting factor for a parameter (e.g., making cache hit rate more important in the decision than it was previously).

Adjustment of the manner of operation of path selection mechanism may be done in any suitable manner. For example, parameters of a data path type selection process may be adjusted globally, for all operations evaluated by the path selection mechanism. Alternatively, parameters may be adjusted for a particular I/O operation or set of I/O operations. A particular set of I/O operations may be I/O operations within a particular time span, operations which are related to a particular information exchange session or file, or may be related in any other desired way. An information exchange session may be established using any suitable information. A file handle uniquely identifies a file and may comprise information about it.

In one embodiment, the file handle (or other identifier for a file) may be used by the path selection to make decisions based upon the identity of the target file for the I/O operation. For example, if the path selection module knows that a particular set of operations are going to be executed for which it would be advantageous to use a particular data path type, or for which the default parameters would otherwise not result in an optimal selection, the path selection module may change the path selection factors for operations related to the file to force a more optimal selection. For example, if the default path selection factors for the path selection module stipulate that all reads are to be performed over the NAS data path (i.e., through the file system server 304) and the path selection module is aware that all operations related to a particular file are going to be retrieving data larger than the size of the cache of the file system server 304—meaning the read operations would not benefit from the cache of the file system server 304 as the files would be too large to be preserved in the cache—the path selection module may override the path selection factors on which the data path selection decision is made such that some or all of the read operations associated with the file could be performed over the SAN data path (i.e., the information is exchanged directly with the storage system 306).

Figure 7:
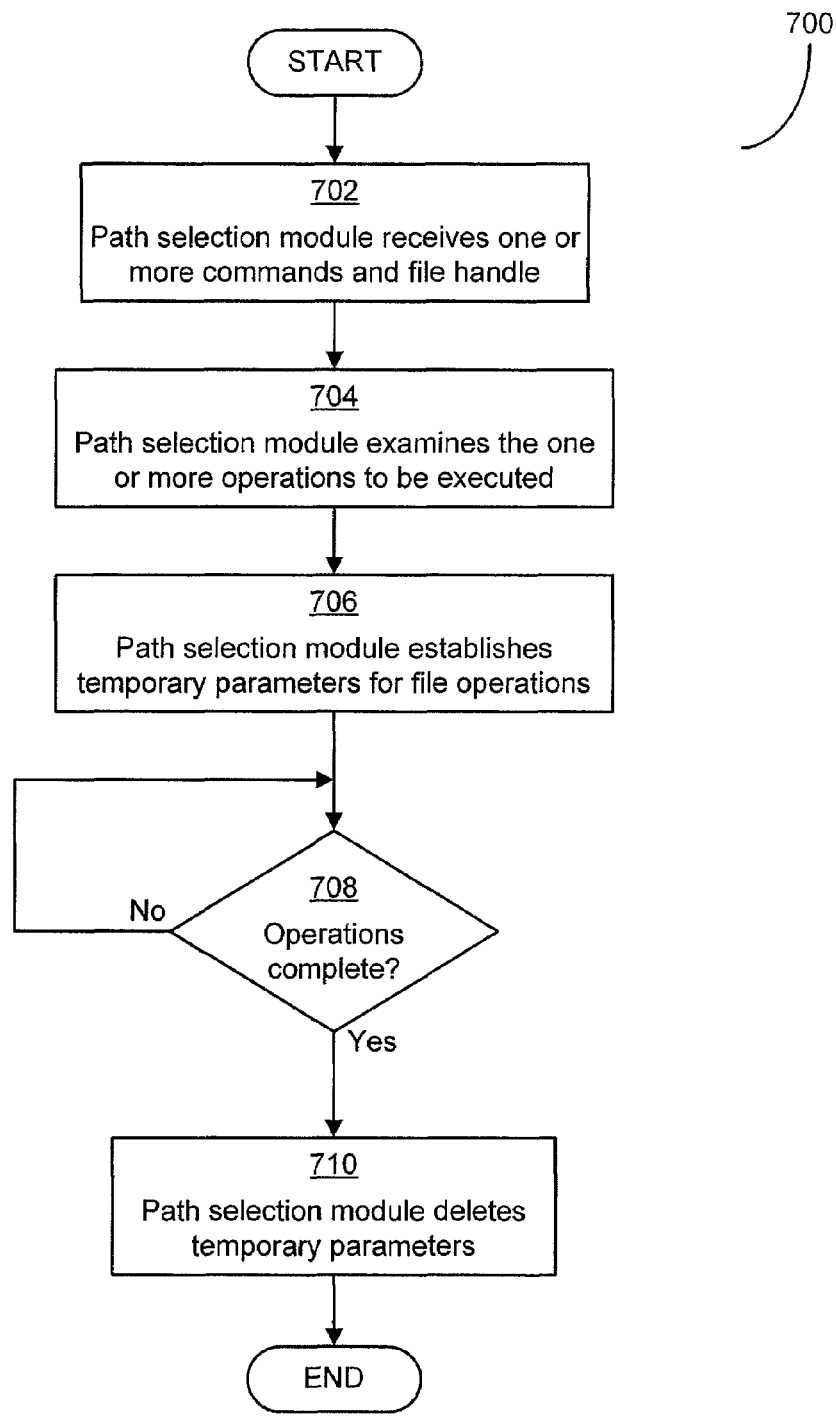
FIG. 7 is a flowchart of an exemplary process for adjusting one or more parameters of a data path type selection process for a set of operations, according to one embodiment of the invention.

FIG. 7 shows an exemplary process 700 which may be implemented for making I/O specific determinations, e.g., for I/O's directed to a specific file (or submit of related files) based upon parameters that differ from those more generally applied. The different parameters can be provided in any suitable manner. As discussed below, in accordance with one embodiment, the path selection module is provided with an interface (e.g., an application programming interface or API) that enables other components in the system (e.g., an application program generating an I/O operation) to influence the decisions made by the path selection module. While the exemplary process of 700 will be discussed in terms of I/O operations related to a file handle, it should be appreciated that varying from the path type selection parameters for any set or subset of I/O operations is not limited to doing so based upon a file handle, and may identify I/O operations for specialized evaluation in any suitable way.

By way of context for the example, the path selection module is configured with global parameters indicating that it should send read operations through the SAN data path if the cache hit rate of the file system server 304 is above sixty percent (i.e., more than sixty percent of I/O operations passed through the file system server are served from the cache instead of the storage system 306).

Process 700 begins in block 702, wherein the path selection module receives one or more commands (from, for example, a host application executing on the client device 302) requesting that information related to a file be exchanged with the storage system 306.

In block 704, the path selection module examines the operation(s) to be executed. The path selection module may detect (or be informed by the host application) that the host application will be performing several read operations within a short time span. From this examination (of block 704), the path selection module may determine that it would be efficient to perform the read operations through the file system server 304, to gain the advantage of the cache of the file system server 304, even if the globally applied path selection factors suggest that the NAS path type should only be selected if the file server cache hit rate is above sixty percent as the short term I/O distribution may differ from the historical norms on which the global factors and their evaluation were determined.

In block 706, the path selection module establishes a set of "temporary" path selection factors considered by the path selection module when determining a data path over which to exchange information related to this I/O operation(s). The temporary path selection factors may be substantially similar to the existing global parameters, or may be entirely different. For example, the new path selection factors may lower the cache hit rate threshold from sixty percent to forty percent, such that it is more likely that the NAS data path will be selected. Alternatively, the new path selection factors may simply stipulate that all reads for the file will be performed over the NAS data path. Any suitable new rules may be established for the path selection module to apply to the operations related to the file, and they may be established in any suitable way, including directly via another entity in the computer system (e.g., the application program issuing the I/O operation.

Once the operations are completed (as determined by block 708), in block 710 the path selection module deletes the new path selection factors which have been added. It should be appreciated that the reference(s) to setting new temporary parameters and deleting them are used conceptually and not intended to limit the manner in which the path selection module is implemented to allow for dynamic input into the selection process for some subset of I/O operations. For example, while the parameters, weightings, evaluation thresholds, etc. may all be modified, the dynamic capability may also be provided by the path selection module applying making a selection decision that evaluates different parameters, weightings and/or thresholds depending on some dynamic trigger, but that does not delete any prior evaluation parameters, weightings and/or thresholds but simply recognizes which to apply for any particular I/O operation.

Embodiments of the invention are not limited to any particular technique for dynamically adjusting the data path selection algorithm (e.g., by varying the parameters, evaluation thresholds and/or weightings for any of the parameters), either for all operations or a subset of even a single operation. The process 700 is merely exemplary of techniques which may be implemented by some embodiments of the invention to carry out this function.

For example, in some embodiments of the invention, temporary adjustments to the path selection process may be established not based on a file, but may instead be established for a set period of time. For example, the path selection algorithm may be changed for a period of time when fewer client devices are executing I/O operations and requesting or issuing information (e.g., at night or at lunchtime). Alternatively, the algorithm could be changed not for a set period of time or a set of operations but rather could be set for all operations executed from a particular path selection module. In this latter case, rather than establishing a new set of parameters, thresholds and/or weightings, the path selection module could change the original parameters of the client device, or remove the old parameters and create new parameters. As discussed above, while conventional systems required that at least some components of the system be restarted before any new or different parameters, thresholds, or weightings (collectively, path selection factors) could be evaluated, and could only evaluate global parameters (e.g., parameters for all operations, not for specific sets of operations), in some embodiments of the invention these path selection factors could be created and changed dynamically, without restarting the path selection module or any device on which it executes, and can be changed on a per-operation basis.

In an alternate embodiment, another parameter that may be evaluated is whether a file is stored on a storage system 306 in multiple, non-contiguous parts stored at different locations on the storage system 306 such that a read operation to retrieve the file will require multiple read operations to the storage system to retrieve all parts of the file. For some systems (e.g., those with a heavy load on the file system server), it may be desirable to select the SAN path to process an access to such a file so that the client device 302 can send the multiple I/O operations directly to the storage system 306 rather than have the file system server 304 execute one large I/O operation comprising multiple smaller I/O operations, which unburdens the file system server 304.

As another example, if the client device 302 determines that a component of the computer system (e.g., the file system server 304) is under a heavy load, then it may determine that it will be more efficient for the computer system as a whole—even though it may not be more efficient for the client device 302—to issue an operation to the component to exchange only a portion of the information which is to be exchanged (e.g., read part of a file rather than a whole file). Thus, the component may execute the smaller operation (e.g., reading part of a file) and exchange the portion of information quickly and move on to the operations of other client devices more quickly, and the computer system as a whole may become more efficient. Thus, changing the manner of operation of the client device 302 may comprise changing parameters of the client device 302, as above, and/or may comprise changing operations to be executed by the client device 302.

Changes may be made to the operation of the path selection module in any suitable manner. For example, as discussed above in conjunction with FIG. 7, the path selection factors may be changed by the path selection module based on determinations that it (the path selection module) has made. Alternatively, path selection factors could be changed by a host application executing on the client device 302. For example, a host application, having knowledge of various characteristics of the computer system and of which operations it is going to be executing in the future, may make changes to the path selection factors by which a data path for those operations is selected such that the operations may be executed in the most efficient manner.

In some such embodiments of the invention which permit a host application (or other system component) to dynamically impact any of the path selection factors discussed above, an Application Programming Interface (API) may be implemented for the path selection module to provide a host application the ability to retrieve information on characteristics of the computer system relevant to path selection (e.g., a cache hit rate and/or cache size of a file system server) and/or to impact the path selection factors upon which a data path is selected. The API may comprise any suitable functions for setting path selection factors of a data path selection process and/or for retrieving from one or more components of a computer system information (e.g., performance characteristics, including system configuration information such as cache size, etc.) that may be used to make a path selection.

For example, the API may have a function mpfs_fallthru_to_nfs to specify that all information should be exchanged with the file system server 304 via the first/NAS data path (i.e., all information should be exchanged via the Network File System (NFS)). This function may specify that all information be exchanged over the first/NAS data path for all I/O operations executed from a particular client device, may specify that only a specified subset of operations exchange information over the first/NAS data path (e.g., only read operations, only operations associated with a specific file, only operations within a certain time window, etc.), that operations should all be processed over the first/NAS data path for a specified period of time, or may specify the impacted operations in any other suitable way. An API may additionally or alternatively have a function mpfs_failback_to_san, which may specify that all information be exchanged with the storage system 306 via the second/SAN data path for operations specified in any suitable way (including the examples described above for the NAS data path). In another embodiment, an API function mpfs_set_min_filesize may be implemented which sets a minimum amount of data that may be exchanged directly with the storage system 306 (over the second data path), such that the path selection module will ensure that all other information (amounts of information less than the minimum) are transferred over the first/NAS data path, via the file system server 304.

It should be appreciated that one or more API functions can be defined to perform any of the functions described herein to facilitate path type selection, including setting path selection factors for the path selection module and retrieving performance characteristics and/or other information from components of the computer system. APIs functions may be implemented to send the performance characteristics and/or other information may be to the path selection module directly to facilitate path selection, or to send the performance characteristics and/or other information another component in the computer system (e.g., a client device) to inform that component in dynamically influencing the path selection performed by the path selection module. It should be appreciated that embodiments of the invention are not limited to implementing one or more APIs, as the described function(s) can be performed in any suitable way.

As discussed above, in one embodiment a host application of a client device 302 (or other system component) may make decisions regarding how a data path type should be selected between the first/NAS data path and the second/SAN data path. The decision regarding this selection is not limited, however, to being made by a path selection module on the client device 302. In some embodiments of the invention, the data path may be selected by the path selection module in other components in the computer system.

One component of the path selection module may be in a host as described above, and another may be in the file system server 304. Upon receiving an I/O instruction from the client device 302, the path selection module component in the file system server 304 may also receive a path selection made by the path selection module component in the host (or elsewhere). If the path selection module component in the file system server 304 determines that the first/NAS data path is the more efficient path for a particular operation (e.g., because the request file is in the cache of the file system server 304), it may override any contrary selection by the path selection module component in the client and return the data from the cache.

In another embodiment, the path selection module may be implemented entirely in the file system server 304. When the file system server 304 provides an indication of its selected path to the client device 302, then the file system server 304 may also provide any necessary metadata regarding one or more files to the client device 302.

When the path selection module is in the file system server 304, it may make the path selection in any suitable manner, such as by any of the techniques discussed above.

In another alternative embodiment, when the path selection module is outside of the file system server (e.g., in a client), the file system server 304 may perform any suitable operation to influence the path selection performed by the path selection module to ensure that the most efficient data path is selected each time a selection is made. For example, a file system server 304 may inform a path selection module in a client device 302 that the file system server 304 has recognized that the other client devices in the computer system are, on the whole, not requesting the same information as the client device 302, and thus the information requested by the client device 302 is not likely to be in the cache of the file system server 304. Thus, it is inefficient for the path selection module to select the NAS data path in these circumstances. The file system server 304 may provide an indicator of this to the path selection module as above, and allow the path selection module to change its path selection factors if it determines that the change would lead to a more optimal selection of data path type (or not change the path selection factors, if the path selection module determines that it would not lead to a more optimal selection), or, in some embodiments of the invention, the file system server 304 may change the path selection factors of the path selection module to ensure that the SAN data path is selected instead of the NAS data path.

As another example, if a file system server 304 determines that a heavy load is being placed on it as the client devices in the computer system are issuing a large number of requests to exchange information over the NAS data path, and this load is leading to a less efficient performance of the file system server 304 as some operations must wait a long time in an operation queue before the file system server 304 is able to execute the operations, then the file system server 304 may send an indicator of this load to the path selection module in one or more client devices, or change the path selection factors of one or more path selection module components. Based on this, the one or more path selection module components may be more apt to select the SAN data path rather than the NAS data path, which will lessen the load on the file system server 304 and allow the file system server 304 to execute more timely the operations it receives (and thus increase efficiency in the computer system).

A file system server 304 (or other component of the computer system) may change the path selection factors of a path selection module in any suitable manner, examples of which are described above. In some embodiments, the change in path selection factors may be an operation left to the path selection mechanism itself, but an indication may be sent to the path selection mechanism from the file system server 304 (or other component) informing it of one or more changes, and the client device may change the path selection factors based on the indication. In alternative embodiments, however, a file system server 304 (or other component) may execute one or more functions that directly edit the one or more path selection factors on the client device. These functions may be in the form of an Application Programming Interface (API) as discussed above, and may transmit the commands in any suitable manner. For example, in some embodiments of the invention, the commands may be transmitted from a component of the computer system such as the file system server 304 to a path selection module in another device using any suitable networking protocol such as the Simple Object Access Protocol (SOAP).

Further, a component of the computer system (e.g., file system server 304) may be adapted to change the I/O operations to be executed by a client device 302. Just as the client device 302 may divide an operation to be executed into two or more smaller operations, or make any other suitable division, in some embodiments of the invention another component of the computer system may force such a division on the client device to increase efficiency in the computer system. For example, just as a client device 302 may divide an operation based on a determination that the file is fragmented on the storage system 306 (i.e., divided into multiple parts and stored in multiple locations), a file system server 304 may determine that a file has been fragmented and may divide a single I/O operation into multiple I/O operations related to the fragments of the file increase the efficiency in exchanging information related to the file. For example, if a client device 302 requests metadata related to a file from the file system server 304, then the file system server 304 may provide the metadata in smaller sets related to the fragmentation of the file, or a file system server 304 may provide in a first response to the request for metadata only metadata related to a first portion of the file, and may provide in subsequent responses metadata related to other portions of the file. As another example, if a file system server 304 is overburdened, it may force a drop in its load by only allowing client devices to issue operations for exchanging small amounts of information by, for example, only providing metadata for smaller operations (including by only providing a smaller part of metadata related to a large file, as discussed in the first example). The path selection mechanism, upon detecting that a file system server 304 is distributing metadata in this fashion, may select the SAN data path as the data path over which to access the file. This may be done to lower the burden on the file system server 304. By removing the multiple file access operations from the file system server 304 and executing them on the client device 302 over the SAN path directly to the storage system 306, the file system server 304 will have more available resources and may therefore be able to more quickly respond to new operations from other client devices (or from the same client device 302) and the execution speed of the entire system may be increased.

It should be appreciated that the above-described techniques for selecting a data path type over which to exchange information related to one or more I/O operations are merely exemplary of the techniques which may be implemented by embodiments of the invention for making a selection based on one or more adjustable parameters and information regarding components and/or performance of the computer system. Any suitable information which may be retrieved from any suitable component of a computer system (e.g., the client device, another client device, a file system server, a storage system, any combination of two or more of these components, etc.) may be used to make a decision as to a data path type to select, and/or may be used to adjust path selection factors of a path selection factors for all operations or a subset of operations. Embodiments of the invention are not limited to executing any particular process or examining any particular type(s) of information in selecting a data path type over which to exchange information.

Embodiments of the invention may also act in any suitable computer system, such as the exemplary computer systems discussed above in conjunction with FIG. 3. Further, any of the components described herein (e.g., a client device, a file system server, storage system) may be implemented using any suitable computing device. Exemplary computing devices are discussed below in conjunction with FIGS. 8-10 to implement these three types of system components, but it should be appreciated that these devices are merely exemplary and embodiments of the invention are not limited to being implemented with these or any other particular computing device configurations.

Figure 8:
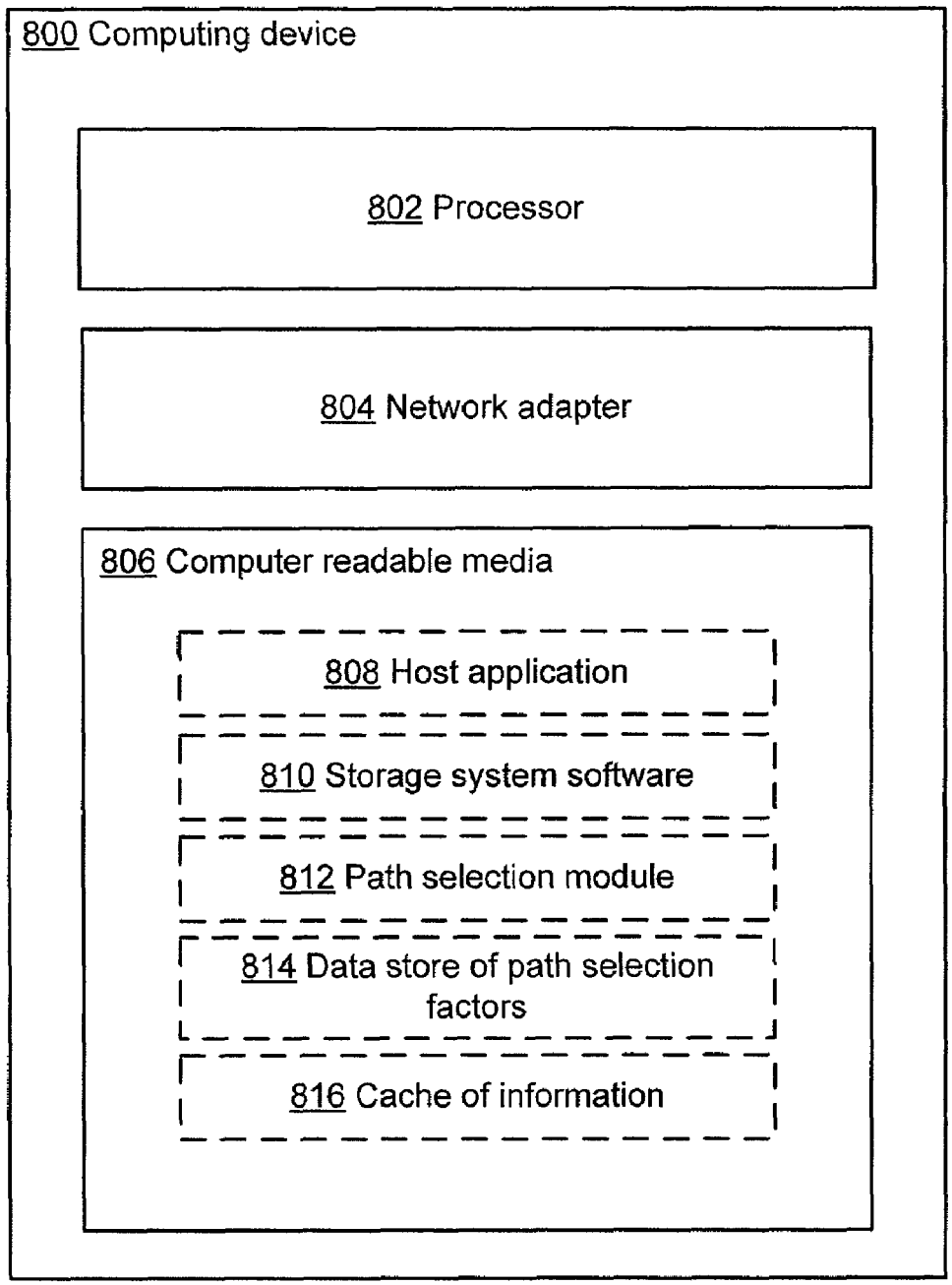
FIG. 8 is a diagram of an exemplary client device having a path selection module adapted to select between a first and second data path type in a computer system in accordance with one embodiment of the invention.
Figure 9:
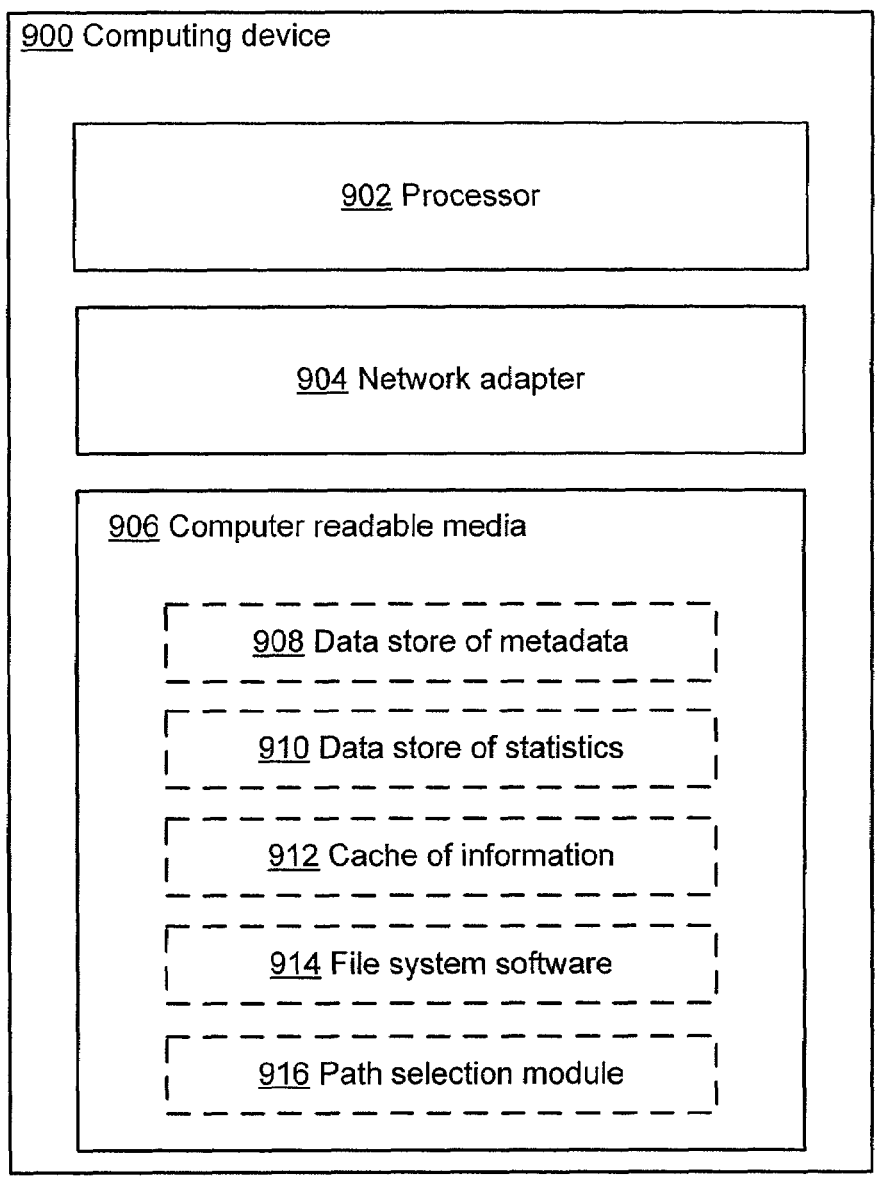
FIG. 9 is a diagram of an exemplary file system server having metadata which may be used to access files and/or other information stored on a storage system in accordance with one embodiment of the invention.
Figure 10:
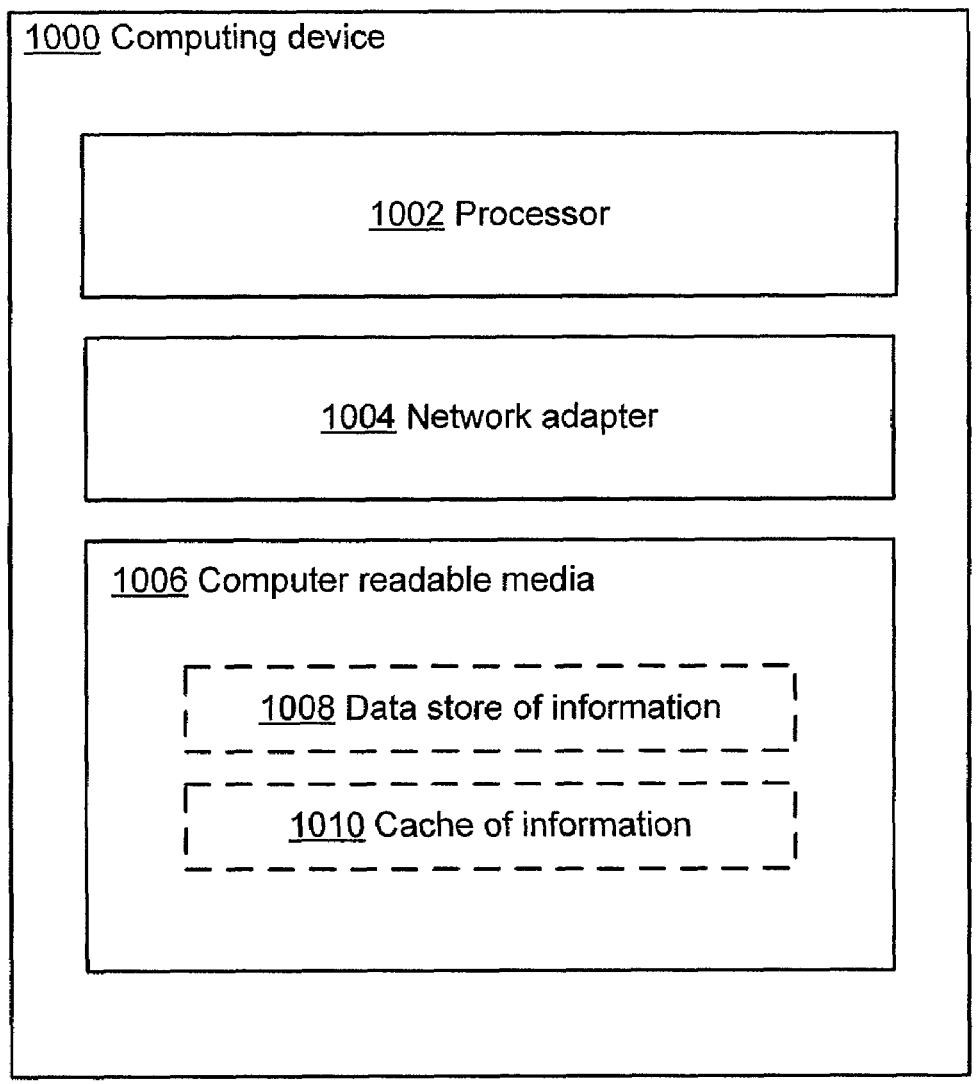
FIG. 10 is a diagram of an exemplary storage system which stores files and/or other information in accordance with one embodiment of the invention.

Further, while FIGS. 8-10 show illustrative computing devices that may be used in accordance with one or more embodiments of the invention, it should be appreciated that FIGS. 8-10 are intended neither to be a depiction of necessary components for a computing device to operate as the corresponding components with embodiments of the invention, nor a comprehensive depiction.

FIG. 8 shows an exemplary computing device 800 which implements a client device 302 in accordance with some embodiments of the invention. Computing device 800 comprises a processor 802, a network adapter 804, and one or more computer-readable media 806. Network adapter 804 may be any suitable hardware and/or software to enable the computing device 800 to communicate with any other suitable computing device over any suitable computing network. The computing network may be any suitable wired and/or wireless communication medium or media for exchanging data between two or more computers. For example, the computing network may be communication network 308. Computer-readable media 806 may be adapted to store data to be processed and/or instructions to be executed by processor 802. Processor 802 enables processing of data and execution of instructions. The data and instructions may be stored on the computer-readable media 806 and may, for example, enable communication between components of the computing device 800.

In accordance with some embodiments of the invention, the data and instructions stored on computer-readable media 806 may comprise a host application 808, a storage system software 810, a path selection module component 812, a data store of parameters 814, and a cache 816 of information and metadata. The host application 808 may be any suitable application for processing, storing, and retrieving information, and may be adapted to operate without knowledge that information is being exchanged with a remote storage medium or may be adapted to operate with the specific knowledge that information is being exchanged with a remote storage medium. The host application 808 may be, for example, a word processing application, a web server, a database client, or other suitable software program. Storage system software 810 may be any suitable software with which a host application 808 may interact to exchange information with the file system server 304 and/or storage system 306 over the communication network 308 (including the NAS and SAN data paths). The storage system software 810 may be implemented in any suitable manner, including as a storage driver with which a host application 808 and/or an operating system of the computing device 800 may interact.

Path selection module 812 may perform any of the functions discussed above, including executing any one or more techniques for selecting a data path over which to exchange information may also be adapted to determine, retrieving any suitable performance characteristics of a computer system in which the computing device is acting as part of selecting a data path, and/or determining/adjusting path selection factors by which a data path is selected as described herein. In some embodiments, path selection module 812 also implements an API by which a host application 808 may interact with the storage system software 810 in any of the ways described above. Path selection module 812 may be a component of a path selection module, as in some embodiments of the invention a path selection module may be disposed on multiple components of a computer system. In such embodiments, the path selection module 812 may be adapted to influence the operations of path selection modules implemented on other components in any suitable fashion, such as by a SOAP or API function call.

The path selection module 812 may maintain a data store of path selection factors 814, and may base a selection of which data path over which to exchange information related to an operation on the path selection factors stored in the data store of path selection factors 814. The data store of path selection factors 814 may be a single set of path selection factors which may be applied to all operations executing on the computing device 800, or may be multiple sets of path selection factors that may be applied to different sets of operations executing on the computing device 800.

In addition, the storage system software 810 may maintain a cache 816 of metadata and information which has been retrieved by the computing device 800 while executing one or more I/O operations and exchanging information with one or more components of the computer system in which the computing device 800 is acting.

FIG. 9 shows an exemplary computing device 900 which implements a file system server 304 in accordance with some embodiments of the invention. Computing device 900 is adapted to receive operations from one or more client devices and exchange information (including metadata about information) with the one or more client devices and with one or more storage systems such as storage system 306 based on the operations as described above. Computing device 900 comprises a processor 902, a network adapter 904, and one or more computer-readable media 906. Network adapter 904 may be any suitable hardware and/or software to enable the computing device 900 to communicate with any other suitable computing device over any suitable computing network. The computing network may be any suitable wired and/or wireless communication medium or media for exchanging data between two or more computers. For example, the computing network may be communication network 308. Computer-readable media 906 may be adapted to store data to be processed and/or instructions to be executed by processor 902. Processor 902 enables processing of data and execution of instructions. The data and instructions may be stored on the computer-readable media 906 and may, for example, enable communication between components of the computing device 900.

In accordance with some embodiments of the invention, the data and instructions stored on computer-readable media 906 may comprise a data store 908 of metadata related to information stored on one or more storage systems of the computer system in which computing device 900 is acting, such as storage system 306. The metadata may comprise any suitable data about the information, such as locations at which files are stored on the storage system, sizes of files, fragmentation properties of files, etc. The metadata of data store 908 may be stored by the computing device 900 as part of file system functionality which is being executed by the computing device 900 for one or more storage systems, such as storage system 306. The computer-readable media 906 may also comprise a data store of statistics 910. The statistics may relate to performance characteristics of the computing device 900, such as a cache hit rate for the computing device 900 (i.e., a percentage of operations executed in which requested information is in the cache 912 and does not need to be retrieved from a storage system), a size of the cache 912, an average response time for the computing device 900 to an operation, a load rate of the computing device 900 (i.e., a percent utilization of the computing device 900), and/or any other suitable characteristics of the computing device 900. Additionally, the data store of statistics 910 may comprise performance characteristics for any other component of a computer system, such as performance characteristics of a storage system such as storage system 306 and performance characteristics of one or more client devices. Computer-readable media 906 may also comprise a cache 912 of information which has been recently requested and/or often requested by client devices of the computer system, or which has been provided by client devices to be written to a storage system. The cache 912 may be of a certain size, and information in the cache may be overwritten as other information is requested or provided, or the cache may grow as necessary according to a load rate or any other suitable performance characteristic. Computer-readable media 906 may further comprise a queue of operations to be executed, the operations being I/O operations (i.e., read/write operations) received from client devices and which are to be executed. Lastly, the computer-readable media 906 may comprise storage system software 914 for executing operations and exchanging information with a storage system and/or with client devices. The file system software 914 may be any suitable software executing any suitable functions, such as any of the file system functionality discussed above, and may determine and/or retrieve performance characteristics to be used in making determinations of how to respond to operations received from client devices (e.g., how to retrieve information from a storage system, and/or how to instruct a client device to interact directly with a storage system). Computer-readable media 906 may further comprise a path selection module 916 executing any or all of the path selection functionality discussed above, and may be implemented as a component of a path selection module, as in some embodiments of the invention a path selection module may be disposed on multiple components of a computer system. In such embodiments, the path selection module 912 may be adapted to influence the operations of path selection modules implemented on other components in any suitable fashion, such as by a SOAP or API function call.

FIG. 10 shows an exemplary computing device 1000 which implements a storage system 306 in accordance with some embodiments of the invention. Computing device 1000 is adapted to receive operations from one or more client devices and/or file system serves and exchange information (including metadata about information) with the one or more client devices and with one or more file system servers based on the operations. Computing device 1000 comprises a processor 1002, a network adapter 1004, and one or more computer-readable media 1006. Network adapter 1004 may be any suitable hardware and/or software to enable the computing device 1000 to communicate with any other suitable computing device over any suitable computing network. The computing network may be any suitable wired and/or wireless communication medium or media for exchanging data between two or more computers. For example, the computing network may be communication network 308. Computer-readable media 1006 may be adapted to store data to be processed and/or instructions to be executed by processor 1002, and may be any suitable storage medium or media, such as one or more disks configured in a disk array. Processor 1002 enables processing of data and execution of instructions. The data and instructions may be stored on the computer-readable media 1006 and may, for example, enable communication between components of the computing device 1000.

In accordance with some embodiments of the invention, the data and instructions stored on computer-readable media 1006 may comprise information 1008. The information 1008 may comprise data and/or instructions of any suitable type, and may be stored on the computer-readable media 1006 in any suitable format. Computer-readable media 1006 may further comprise a cache 1010 of information which had been recently requested and/or often requested by client devices and/or file system servers of the computer system.

As discussed above, it should be appreciated that embodiments of the invention are not limited to being implemented on or with any particular computing device, as embodiments of the invention may be implemented on any suitable computing device executing any suitable technique. Therefore, it should be appreciated that the exemplary computing devices shown in FIGS. 8-10 are merely illustrative of the types of computing devices which may be implemented by embodiments of the invention, and that embodiments of the invention are not limited to being implemented with the computing device shown in FIGS. 8-10.

The above-described embodiments of the present invention can be implemented in any of numerous ways. For example, the embodiments may be implemented using hardware, software or a combination thereof. When implemented in software, the software code can be executed on any suitable processor or collection of processors, whether provided in a single computer or distributed among multiple computers.

Further, it should be appreciated that a computer may be embodied in any of a number of forms, such as a rack-mounted computer, a desktop computer, a laptop computer, or a tablet computer. Additionally, a computer may be embedded in a device not generally regarded as a computer but with suitable processing capabilities, including as any suitable portable or fixed electronic device.

Also, a computer may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface including keyboards, and pointing devices, such as mice, touch pads, and digitizing tables. As another example, a computer may receive input information through speech recognition or in other audible format.

Such computers may be interconnected by one or more networks in any suitable form, including as a local area network or a wide area network, such as an enterprise network or the Internet. Such networks may be based on any suitable technology and may operate according to any suitable protocol and may include wireless networks, wired networks or fiber optic networks.

Also, the various methods or methods outlined herein may be coded as software that is executable on one or more processors that employ any one of a variety of operating systems or platforms. Additionally, such software may be written using any of a number of suitable programming languages and/or conventional programming or scripting tools, and also may be compiled as executable machine language code or intermediate code that is executed on a framework or virtual machine.

In this respect, the invention may be embodied as a computer readable medium (or multiple computer readable media) (e.g., a computer memory, one or more floppy discs, compact discs, optical discs, magnetic tapes, flash memories, circuit configurations in Field Programmable Gate Arrays or other semiconductor devices, etc.) encoded with one or more programs that, when executed on one or more computers or other processors, perform methods that implement the various embodiments of the invention discussed above. The computer readable medium or media can be transportable, such that the program or programs stored thereon can be loaded onto one or more different computers or other processors to implement various aspects of the present invention as discussed above.

The terms "program" or "software" are used herein in a generic sense to refer to any type of computer code or set of computer-executable instructions that can be employed to program a computer or other processor to implement various aspects of the present invention as discussed above. Additionally, it should be appreciated that according to one aspect of this embodiment, one or more computer programs that when executed perform methods of the present invention need not reside on a single computer or processor, but may be distributed in a modular fashion amongst a number of different computers or processors to implement various aspects of the present invention.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Various aspects of the present invention may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

Having thus described several aspects of at least one embodiment of this invention, it is to be appreciated that various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

What is claimed is:

1. A method for use in a computer system comprising at least one client device, at least one storage system that provides at least one volume of storage to store information and at least one file system server that provides a file system interface for at least some of the information stored on the at least one volume of storage, the computer system comprising at least first and second data paths extending between the at least one client device and the at least one storage system, the first data path passing through the at least one file system server so that the at least one client device exchanges information with the at least one storage system via the first path using the file system interface, the second data path not passing through the at least one file system server so that the at least one client device exchanges information with the at least one storage system via the second path using a storage system interface presented by the at least one storage system, the method comprising acts of:

(A) for an input/output (I/O) operation, generated by the at least one client device, that seeks to exchange a first set of information between the at least one client device and the at least one storage system;

(A1) examining information specifying at least one performance characteristic of at least one component of the computer system; and (A2) selecting between the first and second data paths for exchanging the first set of information based at least in part on the at least one performance characteristic of the at least one component of the computer system.

2. The method of claim 1, wherein the at least one component of the computer system is the at least one file server.

3. The method of claim 1, wherein the at least one component of the computer system is the at least one storage system.

4. The method of claim 1, wherein the at least one component of the computer system is the at least one client device.

5. The method of claim 1, wherein the at least one performance characteristic is a cache hit rate for the at least one file server.

6. The method of claim 1, wherein the at least one performance characteristic comprises at least a first characteristic of a first component of the computer system and a second characteristic of a second component of the computer system that is different from the first component.

7. The method of claim 6, wherein each of the first and second components is selected from a group consisting of the at least one file server, the at least one client device and the at least one storage system.

8. The method of claim 1, wherein the at least one performance characteristic is an access time relating to at least one prior access from the at least one client device to the at least one storage system using the first data path and/or the second data path.

9. The method of claim 1, further comprising dynamically modifying at least one path selection factor of a path selection policy for a given set of one or more I/O operations each associated with a specified file; and for each of the given set of one or more I/O operations, applying the path selection policy to select between the first and second data paths for exchanging information.

10. The method of claim 1, wherein the act (A2) comprises selecting between the first and second data paths for exchanging at least some of the first set of information based on the determination of whether the I/O operation seeks to write at least some of the first set of information and on at least one additional path selection factor.

11. At least one computer-readable medium encoded with computer-executable instructions that, when executed perform a method for use in a computer system comprising at least one client device, at least one storage system that provides at least one volume of storage to store information and at least one file system server that provides a file system interface for at least some of the information stored on the at least one volume of storage, the computer system comprising at least first and second data paths extending between the at least one client device and the at least one storage system, the first data path passing through the at least one file system server so that the at least one client device exchanges information with the at least one storage system via the first path using the file system interface, the second data path not passing through the at least one file system server so that the at least one client device exchanges information with the at least one storage system via the second path using a storage system interface presented by the at least one storage system, the method comprising acts of:

(A) for an input/output (I/O) operation, generated by the at least one client device, that seeks to exchange a first set of information between the at least one client device and the at least one storage system;

(A1) examining information specifying at least one historical performance characteristic of at least one component of the computer system; and (A2) selecting between the first and second data paths for exchanging the first set of information based at least in part on the at least one historical performance characteristic of the at least one component of the computer system.

12. The at least one computer-readable medium of claim 11, wherein the at least one component of the computer system is the at least one file server.

13. The at least one computer-readable medium of claim 11, wherein the at least one component of the computer system is the at least one storage system.

14. The at least one computer-readable medium of claim 11, wherein the at least one historical performance characteristic comprises at least a first characteristic of a first component of the computer system and a second characteristic of a second component of the computer system that is different from the first component.

15. The at least one computer-readable medium of claim 14, wherein each of the first and second components is selected from a group consisting of the at least one file server, the at least one client device, and the at least one storage system.

16. The at least one computer-readable medium of claim 11, wherein the first data path comprises a first plurality of parallel links between the at least one client device and the at least one file system server;

wherein the second data path comprises a second plurality of parallel links between the client and the storage system; and wherein selecting between the first and second data path in act (A2) comprises selecting the first or second data path without constraining the at least one client device to exchanging the first set of information via the selected data path over any one or more particular links of the first or second plurality of parallel links.

17. An apparatus for use in a computer system comprising at least one client device, at least one storage system that provides at least one volume of storage to store information and at least one file system server that provides a file system interface for at least some of the information stored on the at least one volume of storage, the computer system comprising at least first and second data paths extending between the at least one client device and the at least one storage system, the first data path passing through the at least one file system server so that the at least one client device exchanges information with the at least one storage system via the first path using the file system interface, the second data path not passing through the at least one file system server so that the at least one client device exchanges information with the at least one storage system via the second path using a storage system interface presented by the at least one storage system, the apparatus comprising:

at least one processor programmed to, for an input/output (I/O) operation, generated by the at least one client device, that seeks to exchange a first set of information between the at least one client device and the at least one storage system;

examine information specifying at least one historical performance characteristic of at least one component of the computer system; and select between the first and second data paths for exchanging the first set of information based at least in part on the at least one historical performance characteristic of the at least one component of the computer system.

18. The apparatus of claim 17, wherein the at least one historical performance characteristic comprises at least a first characteristic of a first component of the computer system and a second characteristic of a second component of the computer system that is different from the first component.

19. The apparatus of claim 17, wherein the at least one historical performance characteristic is a response time relating to at least one prior access from the at least one client device to the at least one storage system using the first data path and/or the second data path.

20. The apparatus of claim 17, wherein the at least one historical performance characteristic is a performance characteristic for the at least one file server.

21. A method for use in a computer system comprising at least one client device, at least one storage system that provides at least one volume of storage to store information and at least one file system server that provides a file system interface for at least some of the information stored on the at least one volume of storage, the computer system comprising at least first and second data paths extending between the at least one client device and the at least one storage system, the first data path passing through the at least one file system server so that the at least one client device exchanges information with the at least one storage system via the first path using the file system interface, the second data path not passing through the at least one file system server so that the at least one client device exchanges information with the at least one storage system via the second path using a storage system interface presented by the at least one storage system, the method comprising acts of:

(A) for each of a first set of one or more input/output (I/O) operations, generated by the at least one client device, that each seek to exchange information between the at least one client device and the at least one storage system, applying a first path selection policy comprising at least one path selection factor to select between the first and second data paths for exchanging information;

(B) in response to an indication to establish a second path selection policy, establishing a second path selection policy that differs from the first path selection policy; and (C) for each of a second set of one or more I/O operations, applying the second path selection policy to select between the first and second data paths for exchanging information.

22. The method of claim 21, wherein establishing the second path selection policy comprises modifying the first path selection policy by adjusting at least one parameter, at least one threshold, and/or at least one weight of the at least one path selection factor.

23. The method of claim 21, wherein establishing the second path selection policy comprises modifying the first path selection policy by adding at least one additional path selection factor to the at least one path selection factor.

24. The method of claim 21, wherein the second set of one or more I/O operations is a set of I/O operations specified in the indication as I/O operations to which the second path selection policy should be applied.

25. The method of claim 24, wherein the specified subset of I/O operations is I/O operations associated with a specified file managed by the at least one file system server.

26. The method of claim 21, wherein the indication to establish the second path selection policy is an instruction from a component of the computer system to establish the second path selection policy.

27. The method of claim 26, wherein the component is a host application executing on the at least one client device.

28. The method of claim 21, wherein the indication is information about a performance characteristic of at least one component of the computer system.

29. The method of claim 21, wherein the act (C) comprises dynamically establishing the second path selection policy different from the first path selection policy without rebooting a computing device executing the method and/or an application program calling the method.

* * * * *